United States Patent
Shimizu et al.

(10) Patent No.: US 8,139,453 B2
(45) Date of Patent: Mar. 20, 2012

(54) BUFFERING CONTROL METHOD, AND BUFFERING CONTROL DEVICE

(75) Inventors: Shiro Shimizu, Osaka (JP); Naoyuki Kashii, Osaka (JP); Hiroshi Yao, Osaka (JP); Kiyokatsu Matsui, Kyoto (JP)

(73) Assignee: Panasonic Corporation, Osaka (JP)

( * ) Notice: Subject to any disclaimer, the term of this patent is extended or adjusted under 35 U.S.C. 154(b) by 426 days.

(21) Appl. No.: 12/442,241

(22) PCT Filed: Sep. 7, 2007

(86) PCT No.: PCT/JP2007/067478
§ 371 (c)(1),
(2), (4) Date: Mar. 20, 2009

(87) PCT Pub. No.: WO2008/035576
PCT Pub. Date: Mar. 27, 2008

(65) Prior Publication Data
US 2010/0027389 A1    Feb. 4, 2010

(30) Foreign Application Priority Data

Sep. 22, 2006  (JP) ................. 2006-257764
Feb. 5, 2007  (JP) ................. 2007-025008

(51) Int. Cl.
*G11B 7/00* (2006.01)
(52) U.S. Cl. ............... 369/47.32; 369/47.34; 369/47.12; 369/84
(58) Field of Classification Search .................. None
See application file for complete search history.

(56) References Cited

U.S. PATENT DOCUMENTS

| | | | |
|---|---|---|---|
| 4,682,317 A | 7/1987 | Tomisawa | |
| 5,402,398 A | 3/1995 | Yoshida | |
| 5,453,964 A | 9/1995 | Shimizume | |
| 5,694,383 A | 12/1997 | Arataki et al. | |
| 5,703,854 A | 12/1997 | Kuroda et al. | |
| 5,818,801 A | 10/1998 | Watanabe et al. | |
| 5,910,935 A | 6/1999 | Takagi et al. | |
| 7,394,750 B2 * | 7/2008 | Kuroda et al. | 369/275.4 |
| 7,496,023 B2 * | 2/2009 | Morishima et al. | 369/275.3 |

(Continued)

FOREIGN PATENT DOCUMENTS

CN    85 1 03577    11/1986
(Continued)

OTHER PUBLICATIONS

Supplementary European Search Report dated Nov. 10, 2010 in corresponding European Patent Application No. 07806919.2.

(Continued)

*Primary Examiner* — Muhammad N Edun
(74) *Attorney, Agent, or Firm* — Wenderoth, Lind & Ponack, L.L.P.

(57) ABSTRACT

When receiving the reproduced data from the optical disc and buffering same, the buffering from the correct position can be started on the basis of the synchronous signal and the address information included in the sub data which was received simultaneously.

There is provided a method for controlling the buffering of the main data which is reproduced from the optical disc, in which the main data and the sub data are received with taking word clocks which are partitioning timings having plural bits of the main data as a unit as references, a synchronous signal which is in synchronization with the main data is generated, and the buffering of the main data is started on the basis of the synchronous signal.

28 Claims, 31 Drawing Sheets

U.S. PATENT DOCUMENTS

| | | |
|---|---|---|
| 2001/0049777 A1 | 12/2001 | Tomioka et al. |
| 2002/0196718 A1 | 12/2002 | Okazaki et al. |
| 2004/0125719 A1 | 7/2004 | Koseki |
| 2005/0114575 A1 | 5/2005 | Weisser et al. |
| 2009/0196126 A1 | 8/2009 | Peter et al. |

FOREIGN PATENT DOCUMENTS

| | | |
|---|---|---|
| EP | 0 726 571 | 8/1996 |
| EP | 0 563 922 | 7/1998 |
| JP | 4-119562 | 4/1992 |
| JP | 2001-236726 | 8/2001 |
| JP | 2002-261716 | 9/2002 |
| WO | 2004/081934 | 9/2004 |
| WO | 2006/010714 | 2/2006 |

OTHER PUBLICATIONS

International Search Report issued PCT/JP2007/067478 Dec. 4, 2007 in the International (PCT) Application No. PCT/JP2007/067478.

Written Opinion of the PCT/JP2007/067478 ISA issued Dec. 4, 2007 in the International (PCT) Application No. PCT/JP2007/067478.

Written Opinion of the IPEA issued PCT/JP2007/067478 Sep. 9, 2008 in the International (PCT) Application No. PCT/JP2007/067478.

International Preliminary Report on Patentability issued Nov. 18, 2008 in the International (PCT) Application No. PCT/JP2007/067478.

* cited by examiner

Fig.6

| | 0 | 1 | 2 | 3 | 4 | 5 | 6 | 7 | 8 | 9 | 10 | 11 | |
|---|---|---|---|---|---|---|---|---|---|---|---|---|---|
| 0 | 0 | 0 | 0 | 0 | 0 | 0 | 0 | 0 | 0 | 0 | 0 | 0 | }sync word |
| 12 | 0 | 0 | 0 | 0 | 0 | 0 | 0 | 0 | 0 | 0 | 0 | 0 | |
| 24 | 1 | Q1 | R1 | S1 | T1 | U1 | V1 | W1 | 0 | 0 | 0 | 0 | ← start bit |
| 36 | 1 | Q2 | R2 | S2 | T2 | U2 | V2 | W2 | 0 | 0 | 0 | 0 | |
| . | . | . | . | . | . | . | . | . | . | . | . | . | |
| 1164 | 1 | Q96 | R96 | S96 | T96 | U96 | V96 | W96 | 0 | 0 | 0 | 0 | |
| 0 | 0 | 0 | 0 | 0 | 0 | 0 | 0 | 0 | 0 | 0 | 0 | 0 | |
| 12 | 0 | 0 | 0 | 0 | 0 | 0 | 0 | 0 | 0 | 0 | 0 | 0 | |

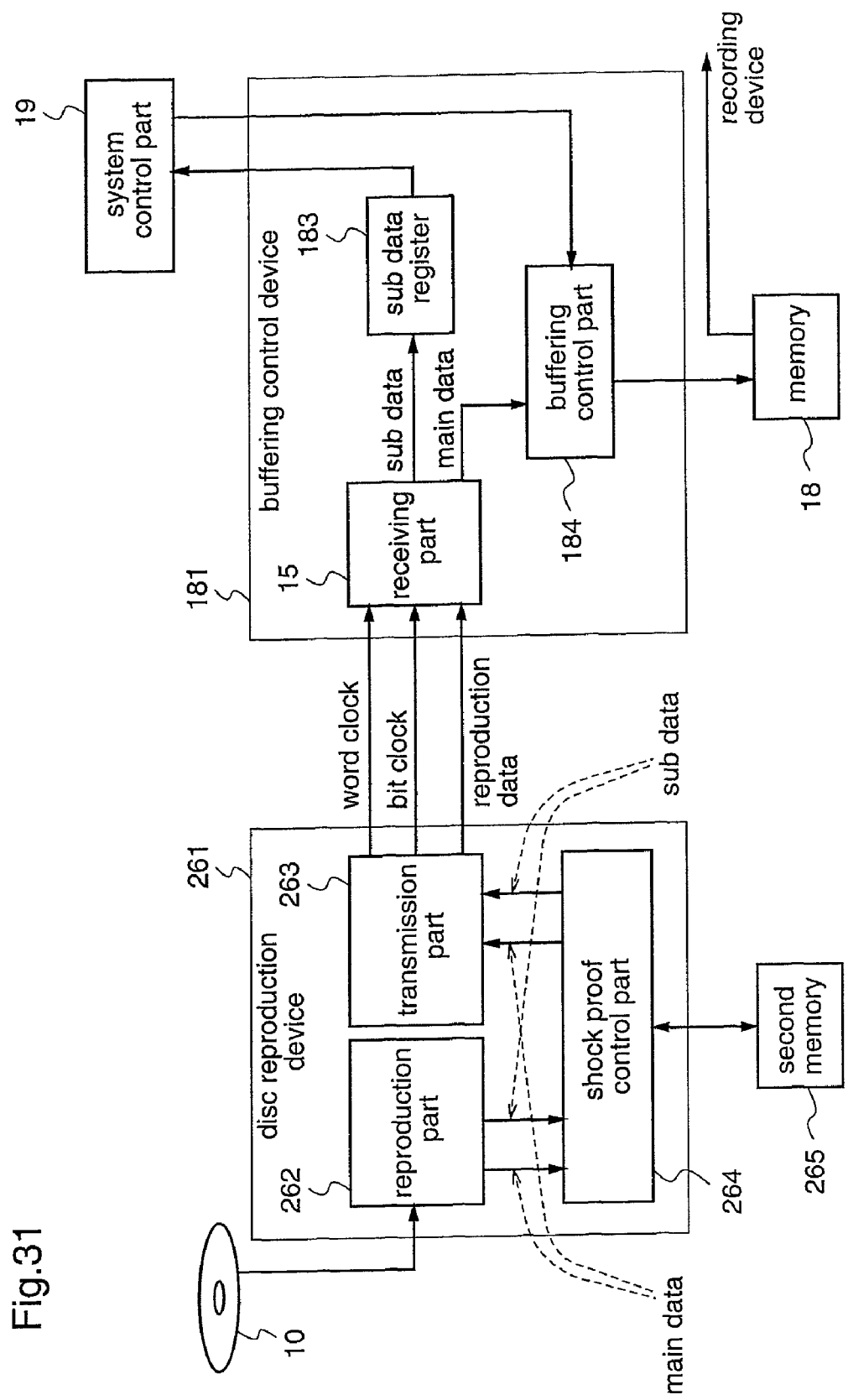

BUFFERING CONTROL METHOD, AND BUFFERING CONTROL DEVICE

TECHNICAL FIELD

The present invention relates to a buffering control method, a buffering control device, a data transfer device, and a data transfer format for receiving data which is reproduced from an optical disc and buffering same, and more particularly, to those which can start buffering from a correct position when recording digital data signal which is reproduced from an optical disc device such as a CD layer into another recording medium.

BACKGROUND ART

Conventionally, as an optical disc on which such as music data are recorded, for example, a CD (Compact Disc) is widely used.

The disc for music CDs has recorded therein music data such as of non-compressed and the usual CD disc has a diameter of 12 cm. To the contrary, in order to improve the portability, it is often practiced that the music data is compressed and the compressed music data is digitally dubbed into an MD (Mini Disc) to enable carrying on of same.

Recently, by performing digital dubbing into a recording medium such as a non-volatile memory or an HDD (Hard disc drive) which have further larger capacities than the MD, a unified administration of music pieces of not only a piece of CD but over a plurality of CDs, and thus, the utilization of portable audios, home audios, and car audios, which reproduce same are spread.

As devices which perform dubbing of music data from the CD, PCs (personal computes) are widely used. However, it is not limited thereto. For example, there are a lot of systems which can perform directly dubbing of music data without employing a personal computer by an audio apparatus such as a stereo component itself, and these systems are accepted in the market in view of easiness of its operation.

FIG. 26 is a construction diagram of such a conventional system which can prevent deterioration of sonic quality which arises due to that the digital signal is once converted into an analog signal and then it is again returned to the digital signal by performing a digital dubbing, i.e., performing dubbing in the state of the digital signal as it is.

In FIG. 26, the disc reproduction device 11 is one which is included in stereo components which can perform directly a digital dubbing by themselves, and which perform reproduction from the optical disc 10 and output the reproduced data. The buffering control device 181 performs a pre-processing of digital dubbing, which comprises receiving the reproduced data from the disc reproduction device 11 and temporarily buffers the data into a memory 18 such as a DRAM. The system control part 19 gives an instruction for buffering to the buffering control device 181.

The reproduction part 12 in the disc reproduction device 11 carries out a series of operations such as a servo control for controlling the pick-up or the spindle motor for the optical disc 10, the digital conversion, demodulation, or the error correction of the signal which was read out from the pick-up. In addition, the transmission part 13 in the digital reproduction device 11 includes an output device for transferring the reproduced data which is reproduced by the reproduction part 12 to another device such as a portable audio system.

The transfer of the data reproduced from the disc reproduction device 11 is generally performed in a serial type which utilizes three lines of a word clock, a bit clock, and a reproduced data line. Particularly, in a reproduction of a music CD, a format in which left and right two channels of music data are transferred with referring to the word clock which is alternated with "H" and "L" as making 16 bit samples as a unit as shown in FIG. 27 is widely used. That is, in accordance with the word clock being "H" or "L", whether the data of 16 bits constituting the music data correspond to either of left and right channel is distinguished. Further, included in the reproduced data which is reproduced from CD, separately from the music data as main data, is sub data for selectively reproducing a disc, i.e., which is, for example one for selectively reproducing a desired music piece from a plurality of music pieces which are recorded in the CD, and such sub data is also transferred when that data is required at the receiver's side.

FIG. 28 is a diagram illustrating an example of a format of data when transferring the sub data and the main data through the same path. The receiving part 182 shown in FIG. 29 corresponds to the receiving part 15. By this construction, the sub data can be transmitted via the same path as the main path, and the number of the data transfer paths can be minimized easily (patent document 1).

The construction of the receiving part which receives this data is shown in FIG. 29.

In FIG. 29, included in the reproduced data which is received in the receiving part 182 are the main data and the sub data, and the main data is transferred to the buffering control part 184 and the sub data is transferred to the sub data register 183, respectively.

More particularly, the shift register 182a of a 17 bit length which is included in the receiving part 182 successively shifts the reproduced data which is successively inputted to its serial input therein synchronized with the bit clock, and when the data of 17 bits are stored, outputs and transfers the stored data from its parallel output of the shift register 182a to the receiving data register 182b. The receiving data register 182b outputs its top bit to the sub data register 183 as sub data as well as remaining data to the buffering control part 184 as main data. By this construction, the main data and the sub data are outputted with synchronized with each other. Here, the receiving register 182b employs the word clock and its inverted clock inverted by the inverter 182c as clocks.

FIG. 30 illustrates a construction of the receiving part 13 of the disc reproduction device 11, which corresponds to the receiving section 182.

In FIG. 30, the main data and the sub data from the reproduction part 12 which are received in the transmission part 13 are stored in the transmission data register 13a. Then, the sub data serves as the top bit and the main data is added thereto at thereafter. These main data and the sub data are transmitted to the shift register 13b in parallel and outputted directed to the receiving part 182 with one by one bit synchronized with the bit clock that is generated by the bit clock generator part 13e. The word clock which alternates being "H" and "L" with 17 bits unit of the bit clock is generated by the word clock generator 13d and is outputted directed to the receiving part 182. Further, the bit clock of 17 bits is generated each time when the main data of 16 bits is inputted by the bit clock generator 13e. Here, the transmission data register 13b employs the word clock and its inverted clock inverted by the inverter 13c as clocks.

In addition, the sub data in the sub data register 183 is checked by the system control part 19 shown in FIG. 26, and thereby the reproduction position on the disc can be recognized and, on the basis of these information the instruction for buffering to the buffering control part 184 is performed. On the basis of the buffering instruction from the buffering control part 19, the buffering of the main data into the memory 18 is performed by the buffering control part 184b.

Then, the data which is once stored in the memory 18 is again read out, and after the compression processing is performed by the compression part which is not shown, the writing in into a recording medium in another device such as a portable audio system such as an MD or HDD is performed.

FIG. 31 is a diagram illustrating an example of another construction of a conventional system which performs dubbing of music data such as from a CD.

In the disc reproduction device shown in FIG. 31, a shock proof control part 264 for preventing a sound jumping at such as vibration is added in the disc reproduction device 11 shown in FIG. 26 so that the reproduced data which is reproduced by the reproduction part 262 is once stored into the second memory 265 such as a DRAM by the shock proof control part 264, and thereafter the reading out of the data is performed to be transferred by the transmission part 263. Here, in order that the main data and the sub data are transferred as reproduced data as shown in FIGS. 28 and 31, it is required that the sub data which corresponds to the main data are written in into and read out from the second memory 265.

Patent Document 1: Japanese Published Patent Application No. 2002-261716 (page 5-6, FIGS. 1 and 2)

DISCLOSURE OF THE INVENTION

Problems to be Solved by the Invention

As described above, the system control part 19 is constructed so as to enable to grasp the starting positions of the music pieces and the positions between the music pieces and thereby to control the start timings of buffering by receiving the main data as well as the sub data. For example, when only designated music pieces are subjected to dubbing, the music piece numbers are investigated from the sub data, the starting positions of the designated music piece is recognized, and an instruction for starting buffering is sent to realize such dubbing.

In the above-described conventional system, however, since the system control part 19 checks the sub data via the sub data register 183, and forwards an instruction to the sub data buffering part after having detected the top and the end of the music piece, there arises a time difference from detecting the buffering starting position of the music piece to starting the buffering, thereby resulting in a deviation between from the correct starting position for buffering that is similarly correct as the original starting position at the reproduction side.

Particularly, with accompanied by the high speed dubbing in recent years, the time difference that is caused by going through the system control part provides larger influences as the transfer rate of data is high, and which results in fatal problems such as lacking of the top appearing sound of the music piece or noise generation at the end of the music piece when reproducing the recording medium such as an MD after the dubbing.

Further, when errors have arisen in the reproduced data by the influences by such as vibrations when reproducing an optical disc in a disc reproduction device for the purposes of performing dubbing, there is no way of directly communicating the generation of errors to the buffering control part in the system shown in FIG. 26. In addition, when the generation of errors is detected through the system control part, the temporal buffering into the memory or the writing in into the recording medium itself has to be again performed from the head of the music piece or the head of the disc, thereby resulting in quite a complicated control being required as well as a lengthy processing time.

Furthermore, recent diversification of media such as a CD-R or RW and requirement of high speed dubbing as described above tends to make the servo control in the reproduction part of the disc reproduction device unstable, and also results in causes in limitations for a further higher speed in a high speed dubbing. While there may be considered a construction in which the shock proof countermeasure as shown in FIG. 31 in order to avoid the errors in the reproduced errors, an addition of a shock proof control part to the disc reproduction device is then required, and further, an addition of a second memory for shock-proofing is also required, thereby resulting in a cost-up.

The present invention is directed to solving the above-described problems and has for its object to provide a buffering control method and a buffering control device which can perform buffering from a correct position at dubbing digital data.

It is a further object of the present invention to provide a buffering control method and a buffering control device which can perform dubbing of reliable data with realizing avoidance of errors in the reproduced data by an easy and a low cost construction as well as shortening the dubbing time.

It is a still further object of the present invention to provide a data transfer device and a data transfer format which can solve the disadvantages in view of anti-noise property when the transfer clock for transferring the data has become high speed accompanied by the increase in the dubbing speed as well as can perform buffering from a correct position at performing dubbing of digital data.

Measurers to Solve the Problems

In order to solve the above-described problems, according to claim 1 of the present invention, there is provided a buffering control method when buffering main data which was reproduced from an optical disc, which comprises: receiving the main data and the sub data which were reproduced from an optical disc with word clocks as references, which word clocks are partitioning timings with taking a plurality of bits of the main data as a unit; generating a synchronous signal which is synchronous with the main data on the basis of the synchronous signal; starting buffering of the main data in synchronization with the synchronous signal; and writing the buffered data into another device which is a device having a recording medium to which the dubbing is performed in the state of the digital signal as it is.

Thereby, it is possible to make the time difference from the detection of the start of the music piece to the start of the buffering gone, thereby enabling buffering from the correct position.

According to claim 2 of the present invention, in the buffering control method of claim 1, the synchronous signal is generated on the basis of the synchronous bit which is included in the sub data.

Thereby, it is possible to generate a timing signal for starting buffering with utilizing the synchronous bit.

According to claim 3 of the present invention, in the buffering control method of claim 1, the synchronous signal is generated on the basis of the particular pattern which is included in the sub data.

Thereby, it is possible to decrease the data quantity which is transferred by the sub data since no data for synchronization is required to be included in the sub data.

According to claim 4 of the present invention, in the buffering control method of claim 3, the synchronous signal is counted periodically with the word clocks, and when the synchronous signals are not detected, the synchronous signals are interpolated at the periodical counting positions.

Thereby, even when the particular pattern cannot be detected, it is surely possible to generate synchronous signals.

According to claim 5 of the present invention, in the buffering control method of claim 1, the synchronous signal is counted periodically with the word clocks, and when the synchronous signals are not detected, the synchronous signals are interpolated at the periodical counting positions.

Thereby, it is possible to perform the buffering from the correct position of the music piece for which the buffering is desired to be performed.

According to claim 6 of the present invention, in the buffering control method of claim 5, the address to be obtained is presumed on the basis of the obtained address information, and when the address information is not obtained, the lacking address information is interpolated with utilizing the presumed address information.

Thereby, even when the address information cannot be detected, it is possible to start buffering from the previously set address.

According to claim 7 of the present invention, in the buffering control method of claim 1, the buffering is halted with detecting the abnormality of the data which is reproduced from the optical disc on the basis the sub data.

Thereby, it is possible to halt the buffering without passing through the system control part, and it is possible to reduce the burden to the whole system.

According to claim 8 of the present invention, in the buffering control method of claim 7, the buffering is halted when the period of the synchronous signal which is generated based on the specific pattern which is included in the sub data is disturbed.

Thereby, it is possible to halt the buffering without passing through the system control part, and it is possible to reduce the burden to the whole system.

According to claim 9 of the present invention, in the buffering control method of claim 7, the buffering is halted when the parity check is carried out on the basis of the sub data and the error is judged.

Thereby, it is possible to halt the buffering without passing through the system control part, and it is possible to reduce the burden to the whole system.

According to claim 10 of the present invention, in the buffering control method of claim 7, the buffering is halted when the reproduction device of the optical disc transmits the sub data with attaching error information thereto and the error information is received.

Thereby, it is possible to halt the buffering without passing through the system control part, and it is possible to reduce the burden to the whole system.

According to claim 11 of the present invention, in the buffering control method of claim 7, the address information is obtained from the sub data and the address information to be obtained is predicted on the basis of the obtained address information, and when the obtained address information and the predicted address information are in-coincident, the buffering is halted.

Thereby, it is possible to halt the buffering without passing through the system control part, and it is possible to reduce the burden to the whole system.

According to claim 12 of the present invention, a buffering control device for buffering main data which was reproduced from an optical disc comprises: a receiving part which receives main data and sub data which were reproduced from an optical disc with word clocks as references, which word clocks are partitioning timings with taking a plurality of bits of the main data as a unit; a synchronizing part which generates a synchronous signal on the basis of the sub data; and a buffering control part which starts buffering of the main data in synchronization with the synchronous signal and writing the buffered data into another device which is a device having a recording medium to which the dubbing is performed in the state of the digital signal as it is.

Thereby, it is possible to make the time difference from the detection of the start of the music piece to the start of the buffering gone, and thereby it is possible to perform buffering from the correct position.

According to claim 13 of the present invention, in the buffering control device of claim 12, the synchronizing part makes the signal which comprises the synchronous bit which is included in the sub data being detected as said synchronous signal.

Thereby, it is possible to generate a timing signal for starting the buffering using the synchronization bit.

According to claim 14 of the present invention, in the buffering control device of claim 12, the synchronizing part makes the signal which was detected as the specific pattern included in the sub data as said synchronous signal.

Thereby, since it is not required to include data for detecting synchronization in the sub data, it is possible to reduce the amount of data which is to be transferred by the sub data.

According to claim 15 of the present invention, the buffering control device of claim 14, further comprises: a counter for counting the synchronous signal with the word clock periodically; and a synchronous interpolation part which interpolates the synchronous signal at the periodic count positions when the synchronous signal is not detected.

Thereby, even when the specific pattern cannot be detected, it is possible to generate surely the synchronous signal.

According to claim 16 of the present invention, in the buffering control device of claim 12, the buffering control part, which comprises an address obtaining part which obtains the address information from the sub data and a coincidence detection part which compares the address information and the designated address which is previously designated, starts buffering of the main data when the obtained address information and the designated address coincide with each other.

Thereby, it is possible to carry out buffering from the correct position of a music piece which is desired to be buffered.

According to claim 17 of the present invention, in the buffering control device of claim 16, the address obtaining part further includes: an address predicting part which predicts the address information to be obtained on the basis of said obtained address information; and an address interpolation part which interpolates the lacking address information using the predicted address information when the address information is not detected.

Thereby, even when the address information cannot be detected, it is possible to start buffering from the address which is previously set.

According to claim 18 of the present invention, the buffering control device of claim 12 further comprises an abnormality detection part which detects abnormality of the data which is reproduced from the optical disc on the basis of the sub data; and the buffering control part halts the buffering when the abnormality of the reproduced data is detected by the amorality detection part.

Thereby, since it is possible to halt the buffering without passing through the system control part, it is possible to reduce the load to the entire system.

According to claim 19 of the present invention, in the buffering control device of claim 18, the abnormality detection part detects the abnormality of the data which is reproduced from the optical disc when the period of the synchronous signal which is detected on the basis of the specific pattern which is included in the sub data is disturbed.

Thereby, since it is possible to halt the buffering without passing through the system control part, it is possible to reduce the load to the entire system.

According to claim 20 of the present invention, in the buffering control device of claim 18, the abnormality detection part detects the abnormality of the data which is reproduced from the optical disc when the parity check is carried out on the basis of the sub data and the error is judged.

Thereby, since it is possible to halt the buffering without passing through the system control part, it is possible to reduce the load to the entire system.

According to claim 21 of the present invention, in the buffering control device of claim 18, the abnormality detection part detects the abnormality of the data which is reproduced from the optical disc when the reproduction device of the optical disc transmits the sub data with attaching error information thereto and the error information is received.

Thereby, since it is possible to halt the buffering without passing through the system control part, it is possible to reduce the load to the entire system.

According to claim 22 of the present invention, the buffering control device of claim 18 further comprises: an address obtaining part for obtaining an address information from the sub data; an address predicting part for predicting an address information to be obtained on the basis of the obtained address information; and the abnormality detection part detecting the abnormality of the data which is reproduced from the optical disc when the obtained address information and the predicted address do not coincide with each other.

Thereby, since it is possible to halt the buffering without passing through the system control part, it is possible to reduce the load to the entire system.

According to claim 23 of the present invention, there is provided a data transfer device which performs transfer of audio data utilizing the polarity clock indicating the polarity of the audio data for each channel, the transfer clock for transferring the audio data, and a plurality of audio data lines which are synchronized with the transfer clock, comprising: a transfer clock generator part which generates the transfer clock of the number which corresponds to the number of the plural data lines which is less than the bit width per a sample for each sample of the audio data; a polarity clock generator part which generates the polarity clock which is synchronized with the transfer clock; a data conversion part which distributes the audio data per a sample to the plural number of data lines of the line number less than the bit width per a sample as well as synchronizes the distributed audio data with the polarity clock so as to output the same with synchronized with the transfer clock with a bit unit; and a data receiving unit which receives the audio data which was distributed to the plural data lines of the line number that is less than the bit width per a sample, the transfer clock, and the polarity clock, and restores the audio data which are distributed to the plural data lines to output the audio data with synchronized with the transfer clock and the polarity clock.

Thereby, since when transmitting audio data together with the transfer clock and the polarity clock, the audio data are transmitted by the parallel transmission, the frequency of the polarity clock is lowered, and therefore, even when the dubbing is performed at a very high multiple speed, the problem of disadvantage in the anti-noise property is solved.

According to claim 24 of the present invention, in the data transfer device of claim 23, the transfer clock generation part generates the transfer clock of the number which corresponds to the line number of the plural data lines which is less than the bit width that is obtained by adding an addition information to the per sample bit width of the audio data, the data conversion part receives the audio data per a sample and its addition information as its inputs, and distributes the audio data of the bit width that is obtained by adding the addition information to the audio data per a sample and the addition information to the plural data lines of the line number that is less than the bit width per a sample of the audio data as well as synchronizes the distributed audio data and the addition information with the polarity clock so as to output the same with synchronized with the transfer clock with a bit unit, and the data receiving unit receives the audio data which was distributed to the plural data lines, the transfer clock, and the polarity clock, and restores the audio data which are distributed to the plural data lines and the addition information to output the audio data and the addition information with synchronized with the transfer clock and the polarity clock.

Thereby, since when the audio data and the addition information are transmitted together with the transfer clock and the polarity clock, the audio data and the addition information are transmitted by parallel transmission, and the frequency of the polarity clock is reduced, even when the dubbing is performed at a very high multiple speed, the problem of disadvantage in the anti-noise property is solved.

According to claim 25 of the present invention, in the data transfer device of claim 24, the data conversion part employs one or plurals selected among the sub code data of the audio data, the sector information, and the error information which are inputted as the addition information.

Thereby, since when the audio data and the addition information are transmitted together with the transfer clock and the polarity clock, the audio data and the addition information are transmitted by parallel transmission, and the frequency of the polarity clock is reduced, even when the dubbing is performed at a very high multiple speed, the problem of disadvantage in the anti-noise property is solved.

According to claim 26 of the present invention, there is provided a data transfer device which performs transfer of audio data utilizing the polarity clock indicating the polarity of the audio data for each channel, the transfer clock for transferring the audio data, and a plurality of audio data lines which are synchronized with the transfer clock, comprising: a transfer clock generator part which generates the transfer clock of the number which corresponds to the number of the plural data lines which is less than the bit width which is obtained by adding an addition information to the bit width per a sample, for each sample of the audio data; a polarity clock generator part which generates the polarity clock which is synchronized with the transfer clock; a data conversion part which distributes the audio data per a sample and the addition information to the plural number of data lines of the line number less than the bit width per a sample as well as synchronizes the distributed audio data and the addition information with the polarity clock so as to output same with synchronized with the transfer clock with a bit unit.

Thereby, since when the audio data and the addition information are transmitted together with the transfer clock and the polarity clock, the audio data and the addition information are transmitted by parallel transmission, and the frequency of the polarity clock is reduced, even when the dubbing is performed at a very multiple speed, the problem of disadvantage in the anti-noise property is solved.

According to claim 27 of the present invention, there is provided a data transfer device which performs transfer of audio data utilizing the polarity clock indicating the polarity of the audio data for each channel, the transfer clock for transferring the audio data, and a plurality of audio data lines which are synchronized with the transfer clock, comprising: a data receiving unit which receives the audio data which was distributed to the plural data lines of the line number that is less than the bit width that is obtained by adding an addition information to the bit width per a sample of the audio data, the transfer clock, and the polarity clock, and restores the audio data which are distributed to the plural data lines and the addition information to output the audio data and the addition information.

Thereby, since when the audio data and the addition information are transmitted together with the transfer clock and the polarity clock, the audio data and the addition information are received by parallel transmission, and the frequency of the polarity clock is reduced, even when the dubbing is performed at a very high multiple speed, the problem of disadvantage in the anti-noise property is solved.

According to claim 28 of the present invention, there is provided a data transfer device which performs transfer of audio data utilizing the polarity clock indicating the polarity of the audio data for each channel, the transfer clock for transferring the audio data, and a plurality of audio data lines which are synchronized with the transfer clock, comprising: a data receiving unit which receives the audio data which was distributed to the plural data lines of the line number that is less than the bit width that is obtained by adding an addition information to the bit width per a sample of the audio data, the transfer clock, and the polarity clock, and restores the audio data which are distributed to the plural data lines and the addition information to output the audio data and the addition information; a synchronizing part which generates a synchronous signal on the basis of the addition information; and a buffering control part which starts buffering of the audio data on the basis of the synchronous signal.

Thereby, since when the audio data and the addition information are transmitted together with the transfer clock and the polarity clock, the audio data and the addition information are received by parallel transmission, and the frequency of the polarity clock is reduced, even when the dubbing is performed at a very high multiple speed, and the problem of disadvantage in the anti-noise property is solved as well as it is possible to make the time difference from the detection of the start of the music piece to the start of the buffering gone, thereby enabling performing buffering from the correct position.

According to claim 29 of the present invention, there is provided a data transfer device which performs transfer of audio data utilizing the polarity clock indicating the polarity of the audio data for each channel, the transfer clock for transferring the audio data, and a plurality of audio data lines which are synchronized with the transfer clock, comprising: a transfer clock generator part which generates the transfer clock of the number which corresponds to the number of the plural data lines which is less than the bit width which is obtained by adding an addition information to the bit width per a sample, for each sample of the audio data; a polarity clock generator part which generates the polarity clock which is synchronized with the transfer clock; a data conversion part which distributes the audio data per a sample and its addition information to the plural number of data lines of the line number less than the bit width per a sample as well as synchronizes the distributed audio data and the addition information with the polarity clock so as to output same with synchronized with the transfer clock with a bit unit; a data receiving unit which receives the audio data which was distributed to the plural data lines of the line number that is less than the bit width that is obtained by adding an addition information to the bit width per a sample of the audio data, the transfer clock, and the polarity clock, and restores the audio data which are distributed to the plural data lines and the addition information to output the audio data and the addition information; a synchronizing part which generates a synchronous signal on the basis of the addition information; and a buffering control part which starts buffering of the audio data on the basis of the synchronous signal.

Thereby, since when the audio data and the addition information are transmitted together with the transfer clock and the polarity clock, the audio data and the addition information are transmitted by parallel transmission, and the frequency of the polarity clock is reduced, even when the dubbing is performed at a very high multiple speed, the problem of disadvantage in the anti-noise property is solved as well as it is possible to make the time difference from the detection of the start of the music piece to the start of the buffering gone, thereby enabling performing buffering from the correct position.

According to claim 30 of the present invention, there is provided a data transfer format used when performing transfer of audio data utilizing the polarity clock indicating the polarity of the audio data for each channel, the transfer clock for transferring the audio data, and a plurality of audio data lines which are synchronized with the transfer clock, wherein the audio data per a sample is distributed to be divided into serial data of the number that is less than the bit width of the audio data per a sample and the addition information of the audio data is filled in into the empty bit which is generated in the serial data region by the distribution.

Thereby, since when the audio data and the addition information are transmitted together with the transfer clock and the polarity clock, the audio data and the addition information are transmitted by parallel transmission, and the frequency of the polarity clock is reduced, even when the dubbing is performed at a very high multiple speed, the problem of disadvantage in the anti-noise property is solved as well as it is possible to make the time difference from the detection of the start of the music piece to the start of the buffering gone, thereby enabling buffering from the correct position.

Effects of the Invention

According to the present invention, since when performing digital dubbing of mainly the music data of CD, the buffering of the main data is carried out on the basis of the synchronization signal of the sub data, the time difference from detecting the buffering start point of a music piece to starting the buffering is gone, thereby enabling performing buffering from the correct position.

In addition, the replacement of the shock proof control which was conventionally performed in the disc reproduction device side could be performed, and thereby, the memories for the shock proof control and the shock proof operation at the disc reproduction device side are reduced, thereby realizing the rationalization in constituting the system.

BRIEF DESCRIPTION OF THE DRAWINGS

FIG. 6 is a diagram illustrating an example of the sub data (application of the user data bit in a CD).

FIG. 30 is a diagram illustrating a transmission part in the disc reproduction device which corresponds to the receiving part in FIG. 29.

FIG. 31 is a diagram illustrating a construction of the dubbing system which corresponds to the shock proof control in the conventional device.

DESCRIPTION OF REFERENCE NUMERALS

Figure 1:
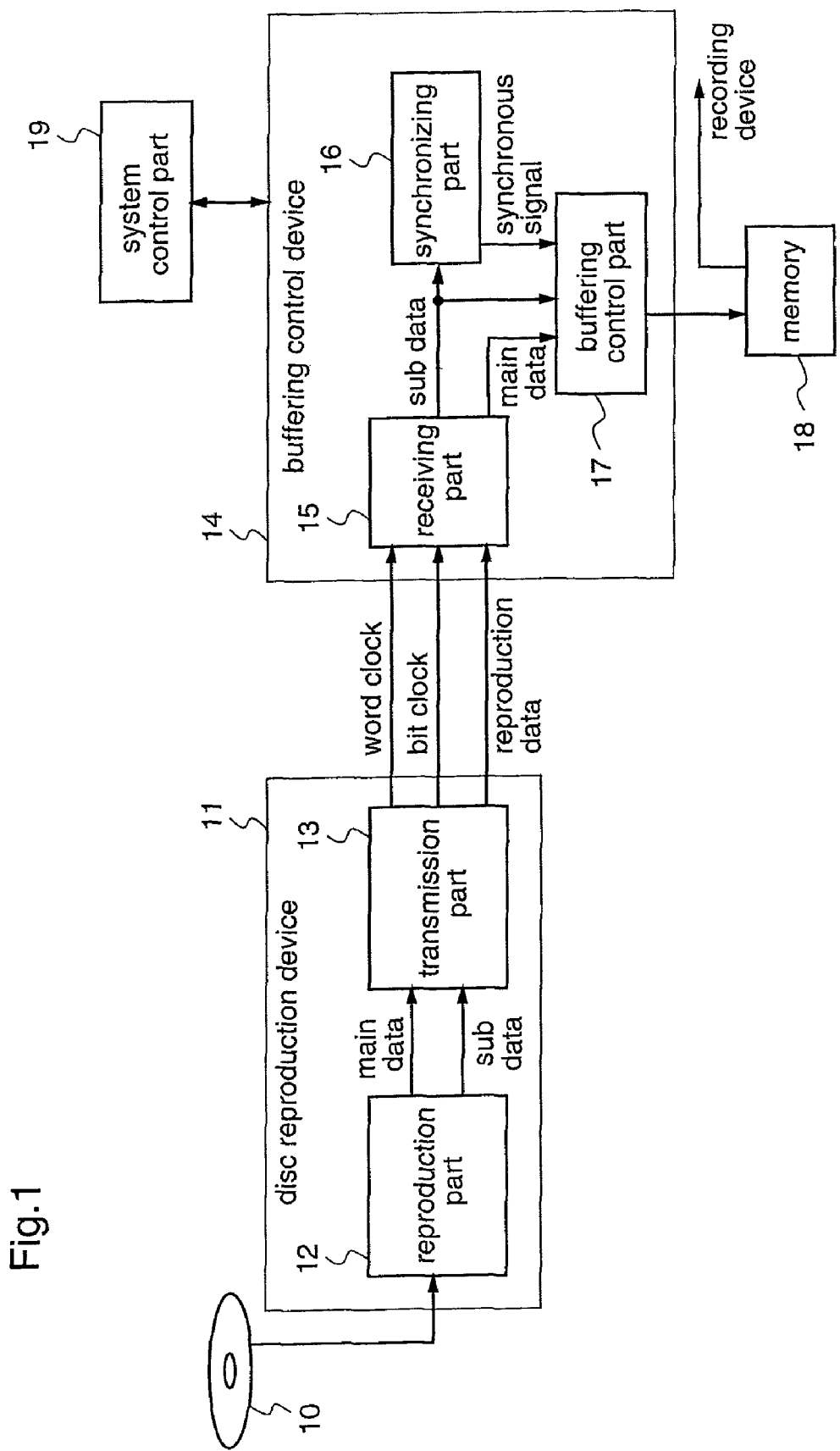
FIG. 1 is a diagram illustrating a dubbing system which includes a buffering control device and a data transfer device according to a first embodiment of the present invention.

10 . . . optical disc
11 . . . disc reproduction device
12 . . . reproduction part
13 . . . transmission part
14, 181 . . . buffering control device
15 . . . receiving part
16 . . . synchronizing part
17, 184 . . . buffering control part
18 . . . memory
19 . . . system control part
41 . . . synchronization detection part
41$a$ . . . logic gate
41 . . . synchronization interpolation part
71 . . . synchronization interpolation part
71$a$ . . . counter
91 . . . address obtaining part
92 . . . coincidence detection part
93 . . . writing control part
93$a$ . . . buffer
94 . . . designated address storing part
111 . . . address detection part
112 . . . judgment part
113 . . . predicted address calculating part
114 . . . address interpolation part
171 . . . NG time counter
173 . . . NG time comparator part
174 . . . NG time setting value storing part
183 . . . sub data register
201 . . . signal input part
202, 303 . . . transfer clock generating part
203, 304 . . . polarity clock generating part
204, 305 . . . data conversion part
204$b$0, 204$b$1, 204$b$2, 404$b$3, 305$b$0, 305$b$1, 305$b$2 . . . shift registers
204$b$4 . . . register
204$c$, 305$c$ . . . inverter
205$a$0, 205$a$1, 205$a$2, 205$a$3, 306$a$0, 306$a$1, 306$a$2 . . . shift registers
205$a$4 . . . register
205$c$, 306$c$ . . . registers
206 . . . signal output part

BEST MODE TO EXECUTE THE INVENTION

Embodiment 1

Hereinafter, embodiments of the present invention will be described with reference to the drawings.

The buffering control device according to a first embodiment of the present invention is constituted so as to enable, when performing digital dubbing of such as music data from a CD player (disc reproduction device) for reproducing an optical disc to such as a portable audio system, to start buffering from a correct position in temporarily buffering the received main data into a memory device as a preprocessing up to writing down the data into the recording medium after performing compression processing of the data.

FIG. 1 is a diagram illustrating a construction of a dubbing system which performs digital dubbing utilizing a buffering control device according to the first embodiment of the present invention.

Figure 26:
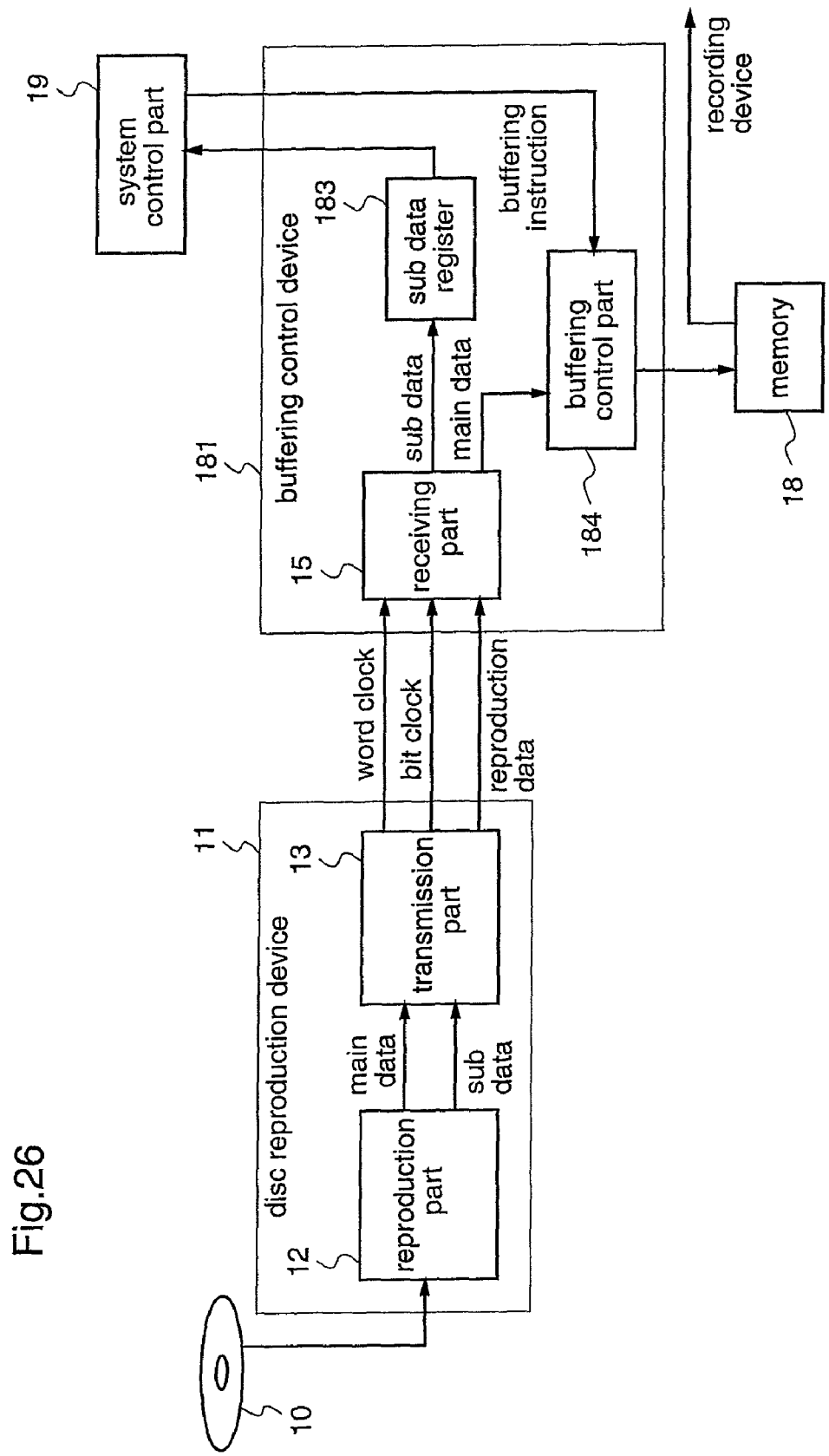
FIG. 26 is a diagram illustrating a construction of a prior art dubbing system.
Figure 27:
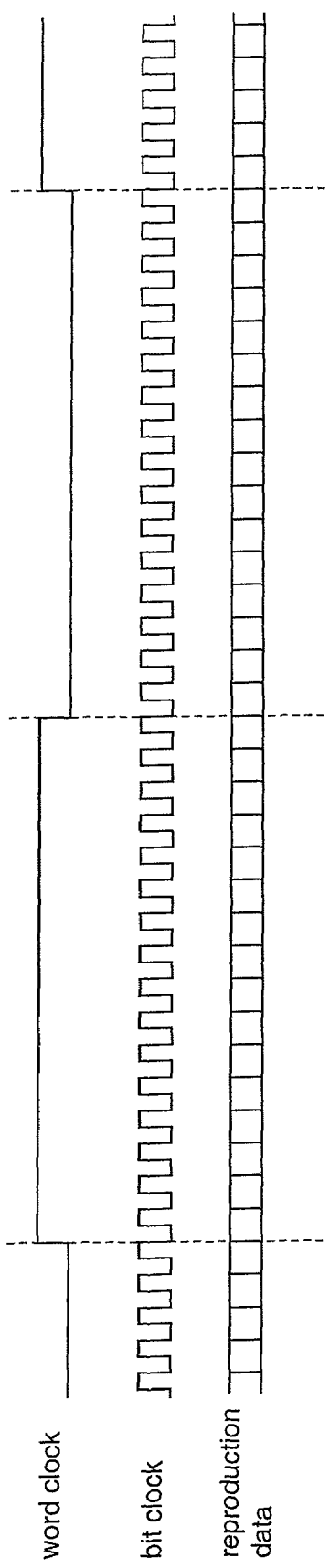
FIG. 27 is a diagram illustrating an example of a transfer format for transforming the reproduced data in the conventional device.

In FIG. 1, the disc reproduction device 11 is constructed similarly to the conventional disc reproduction device 11 shown in FIG. 26, and this device is intended to reproduce the optical disc 10 and output the reproduced data.

The buffering control device 14 comprises a receiving part 15 which receive the main data and the sub data which are reproduced and transferred from the disc reproduction device 11 as well as the word clock and the bit clock, a synchronization part 16 which receives the sub data from the receiving part 15 and generates a synchronous signal, and a buffering control part 17 which controls the buffering of the main data on the basis of the synchronous signal.

Though not shown in FIG. 1, the word clock which is outputted from the disc reproduction device 11 is also supplied to the synchronization part 16 and the buffering control part 17 in the buffering control device 14.

The memory 18 is intended to temporarily store the main data which was transmitted from the buffering control device 14, and the data which was stored in the memory 18 are sent to a memory device which in turn performs writing of the data into another memory medium of a device as a target for performing the dubbing.

The system control part 19 is intended to perform respective settings to the buffering control device 14.

The above-described buffering control device 14, the memory 18, and the system control part 19 are constituted by one or plural integrated circuit(s).

Next, the buffering control device 14 shown in FIG. 1 is described in detail.

The receiving part 15 receives the main data and the sub data which are transmitted from the transmission part 13 in the disc reproduction device 11, and this part can be realized by the similar construction to that of the receiving part 15 in the conventional buffering control device 181 shown in FIG. 26. Among the reproduced data which were received by the receiving part 15, the main data is sent to the buffering control part 17 and the sub data is sent to the synchronization part 16, respectively.

The transfer speed for the data which were sent out from the transmitting part 13 is absorbed by the buffering mechanism which comprises the buffering control device 14 and the memory 18 in all cases of the transfer speed at the usual reproduction speed of CD or at a high multiple speed or a variable speed, thereby reducing the influences on the latter stage systems. However, in order to handle the data correctly in a sample unit that is partitioned by the word clock, it is desired that the main data and the sub data are transmitted with corresponded to each other in the transmission part 13 in the disc reproduction device 11. That is, the main data and the sub data are desired to be transmitted with synchronized with each other, and thereby, it is possible to employ the buffering control device 14 of the present invention as a replacement of the shock proof control, thereby realizing the rationalization of the system, i.e., the reduction in the circuit size.

Figure 2:
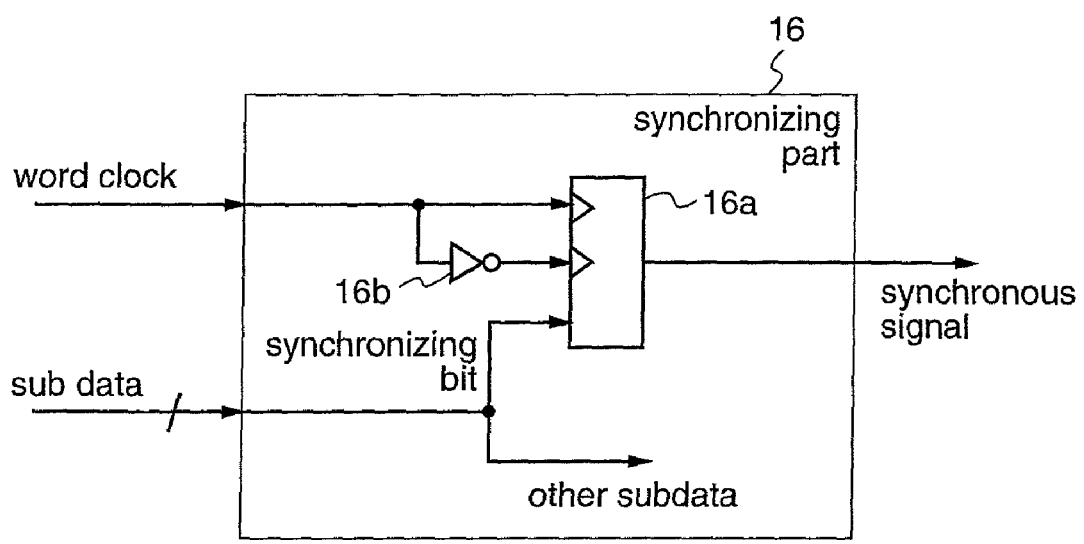
FIG. 2 is a diagram illustrating a first constitutional example of the synchronization part according to the first embodiment of the present invention.
Figure 3:
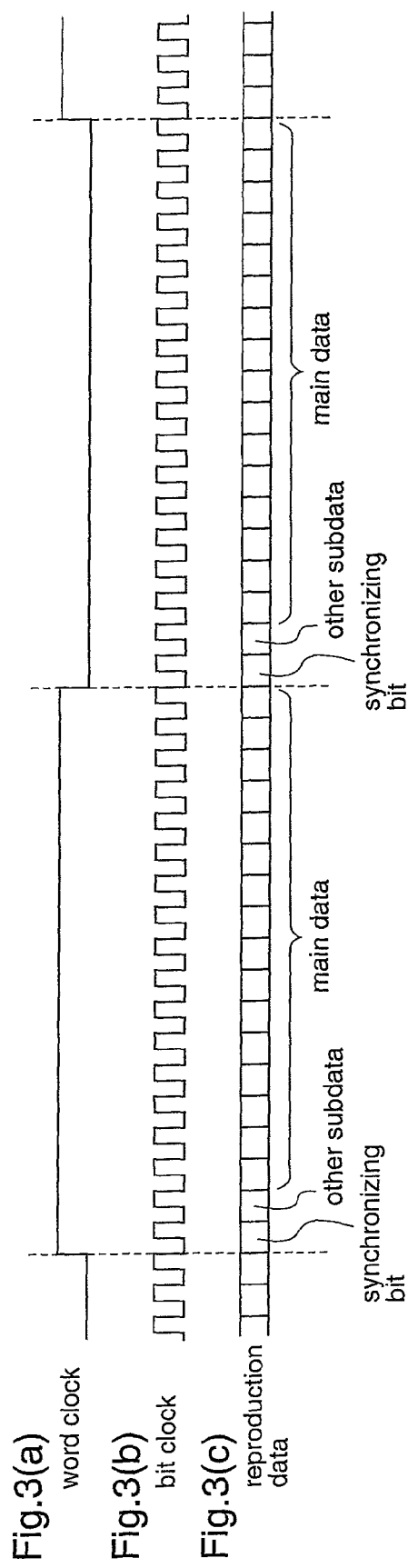
FIG. 3 is a diagram illustrating an example of a transfer format in which the synchronous bit is included in the sub data.

FIG. 2 is a diagram illustrating an example of a concrete construction of the synchronization part 16 shown in FIG. 1. The construction of the synchronization part 16 shown in FIG. 2 is employed, for example, when receiving the data of the transfer format in which the synchronous bit is included in the sub data as shown in FIG. 3. In this case, while the sub data of two bits is received per a sample of the main data that is partitioned by the word clock, one bit among them is given as a synchronous bit.

In the synchronization part 16 shown in FIG. 2, by that the synchronous bit which is included in the sub data is latched by the register 16a which uses the word clock and the inverted word clock that is inverted by the inverter 16b as clocks, the synchronous bit which was selected by the sub data is resynchronized with the word clock and is outputted as the synchronous signal.

In this way, the synchronous signal which was generated from the sub data is synchronized with the main data which is transmitted synchronized with the word clock and this synchronous signal is sent out to the buffering control part 17 to be used as a timing signal for starting the buffering.

Here, the synchronous bit in the sub data which is transmitted from the disc reproduction device 11 may comprise the synchronous bit itself which is included in the reproduced sub data or may comprise the synchronous signal which was generated on the basis of the sub data in the transmission part 13 being received.

Figure 4:
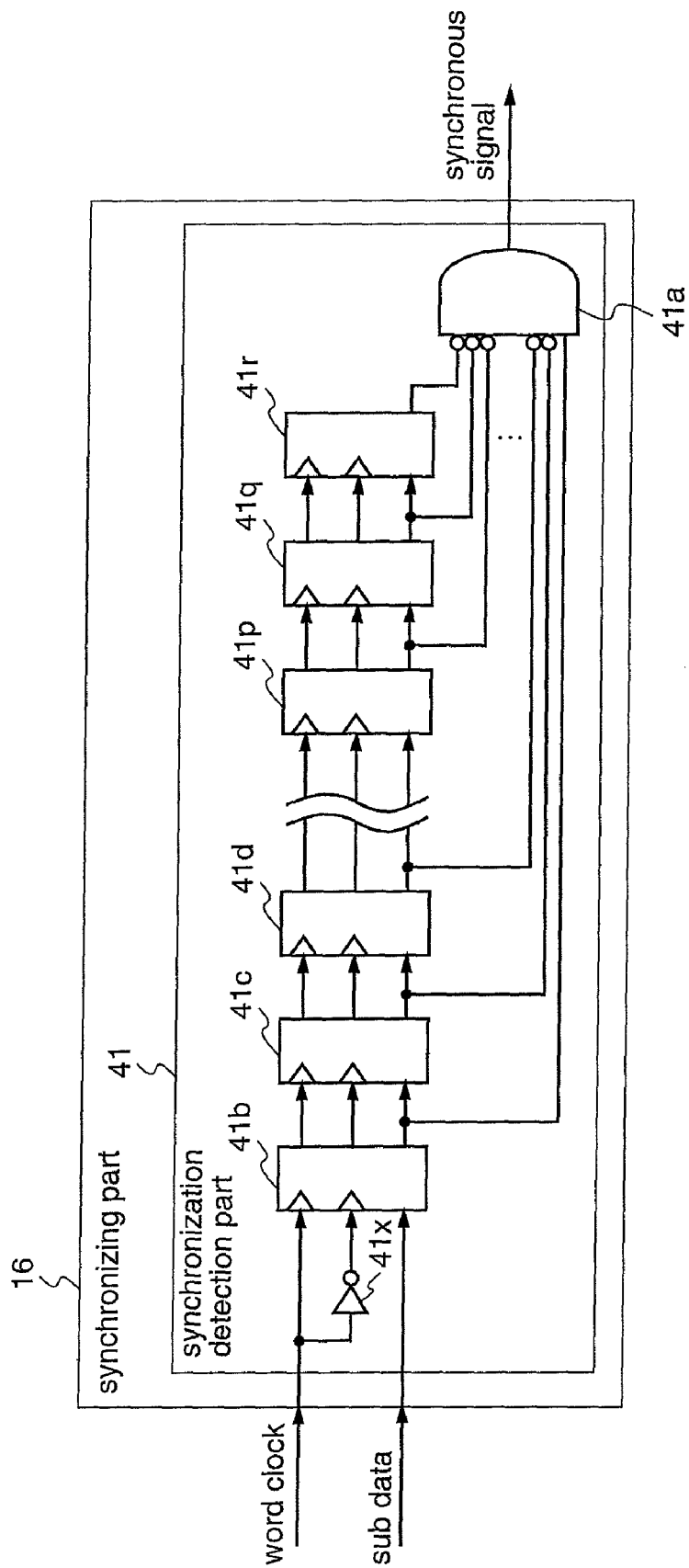
FIG. 4 is a diagram illustrating a second constitutional example of the synchronization part according to the first embodiment of the present invention.

FIG. 4 is a diagram illustrating another concrete constitutional example of the synchronization part 16.

The synchronization part 16 shown in FIG. 4 is intended to generate a synchronous signal by detecting the specific pattern which is included in the sub data by the synchronization detection part 41.

Figure 28:
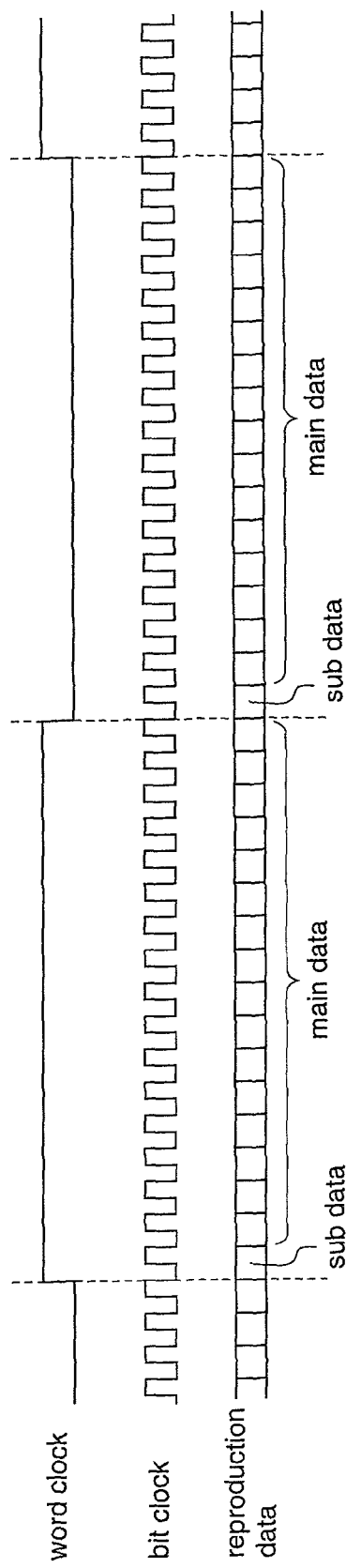
FIG. 28 is a diagram illustrating an example of the format by which the sub data and the main data are transferred via the same path.
Figure 29:
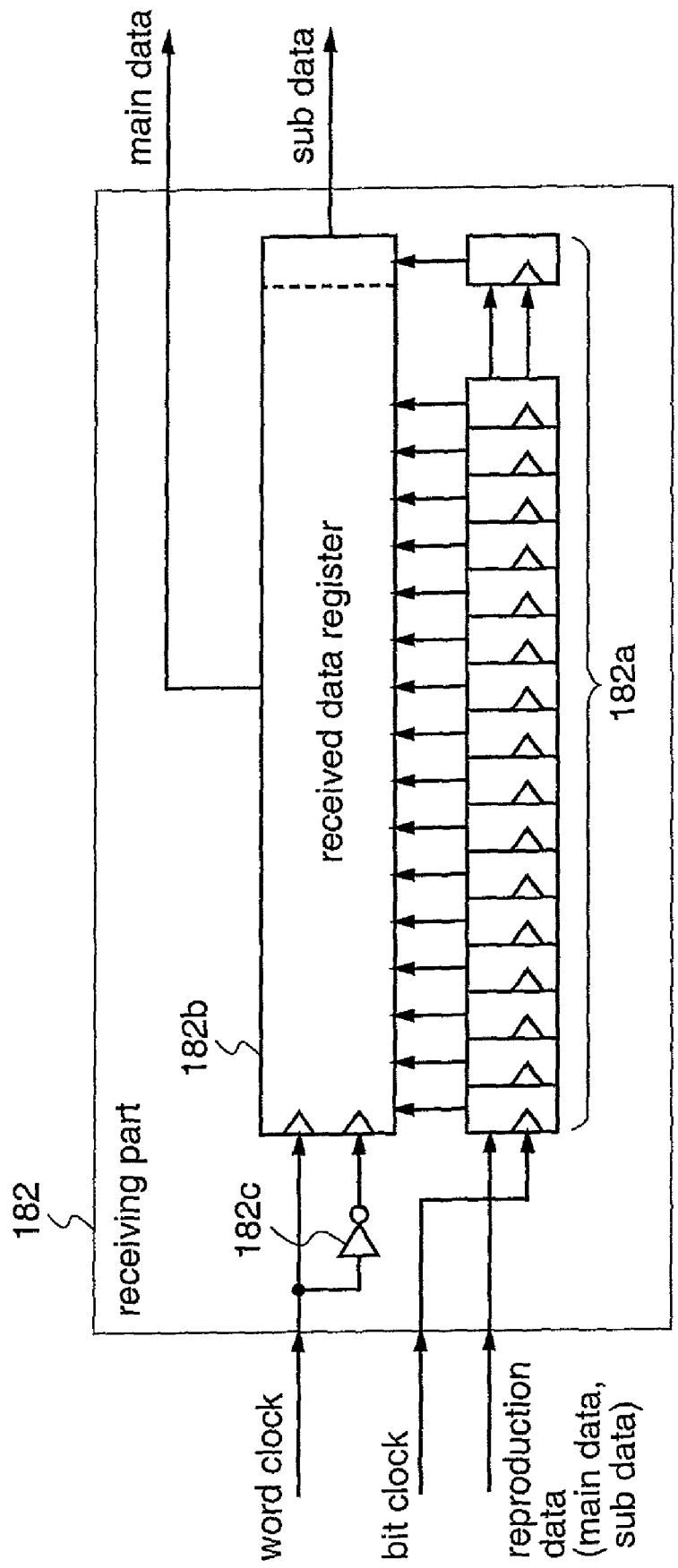
FIG. 29 is a diagram illustrating a receiving part which receives the data of the transfer format shown in FIG. 28.
Figure 30:
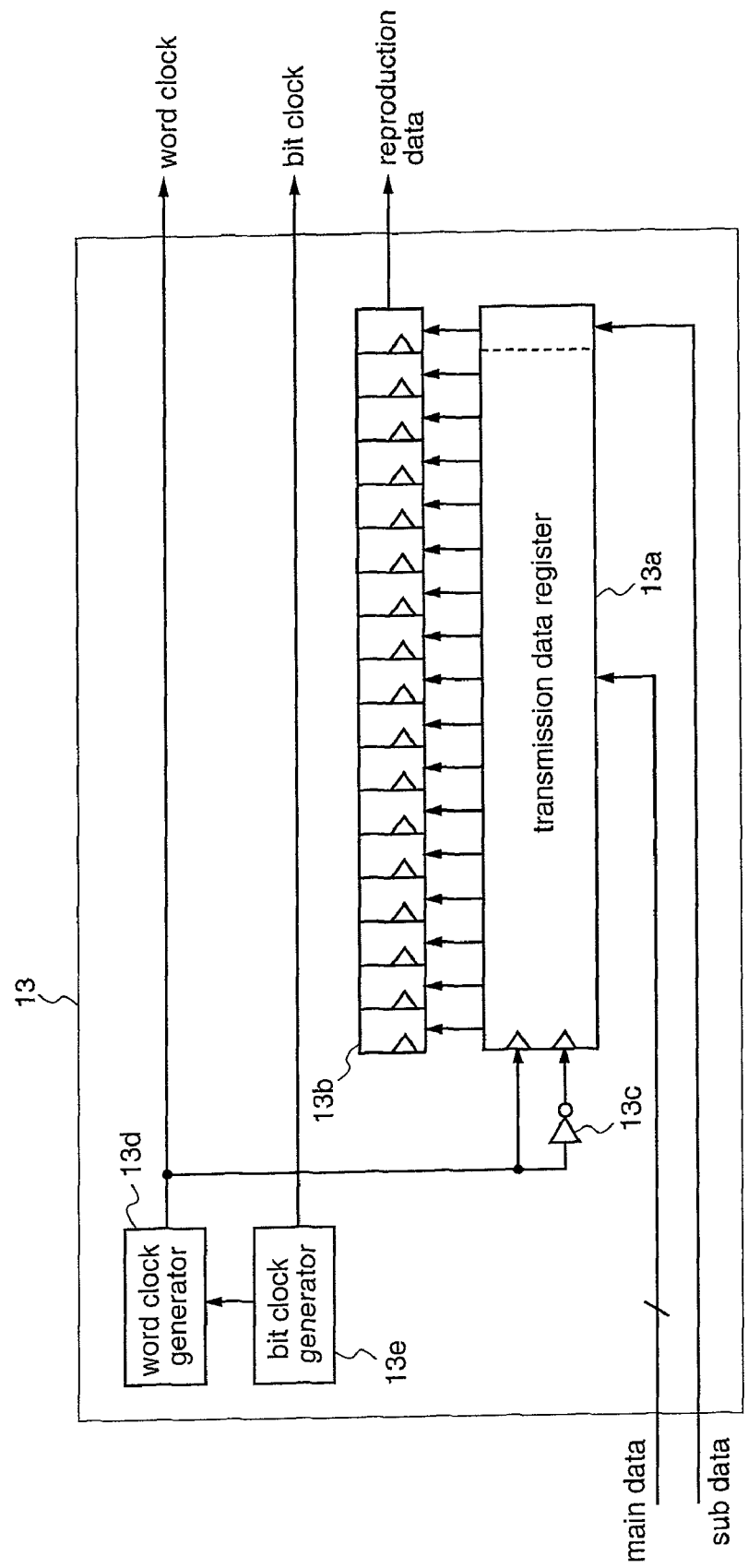
FIG. 30 is a diagram illustrating a transmission part in the disc reproduction device which corresponds to the receiving part shown in FIG. 29.

When the sub code data of CD is to be obtained in a serial format, it is general to employ the format of the user bit of digital audio interface in IEC60958. When applying this user bit as the sub data, it is possible to perform transmission in the format as shown in FIG. 28. Then, one frame of CD is produced comprising twelve audio samples and one sub code symbol. A block is constituted comprising ninety-eight sub code symbols, and the data as the user bit comprises 12×98=1176 bits (refer to FIG. 6).

Herein, the sync word is represented comprising at least 16 continuing "0" bits, and the synchronization of the block can be taken with the start bit "1" which comes next as a reference. The synchronization detection part 41 shown in FIG. 4 detects this as a synchronous pattern in which seventeen registers 41b, 41c, 41d, . . . , 41p, 41q, and 41r which employ the word clock and its inverted clock that is inverted by an inverter 41x as clocks are serially connected so as to successively shift the sub data and the start bit, and thereby, a synchronous signal is generated by the logic gate 41a which detects the specific pattern from the sub data which are shifted in by the word clocks and the start bit. More particularly, the logic gate 41a is a 17 input logical AND gate which has a non-inverted input only for the input corresponding to the output of the register 41b and has inverted inputs for the inputs corresponding to the outputs of all the remaining registers 41c, 41d, . . . , 41p, 41q, and 41r. Therefore, when the sub data and the start bit coincide with the specific pattern, i.e., "00000000000000001", the logic gate 41a generates a synchronous signal.

Figure 5:
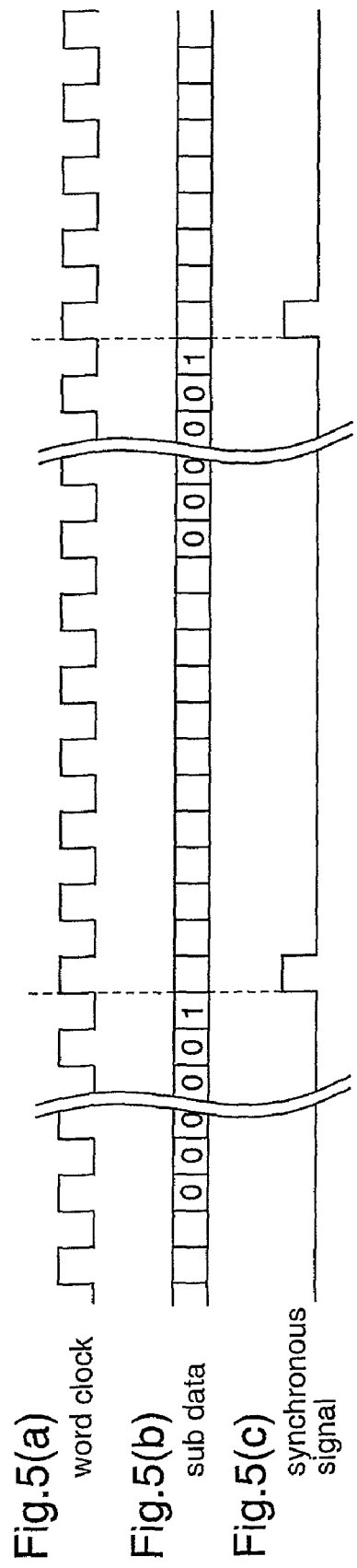
FIG. 5 is a diagram illustrating the timing for detecting the synchronous pattern in the sub data.

FIG. 5 illustrates a timing chart showing the actual manner of generating the synchronous signal by detecting the specific pattern. The synchronization detection part 41 generates a synchronous signal (c) with taking the start bit "1" which comes after the sync word which is included in the sub data (b) as a reference.

Figure 7:
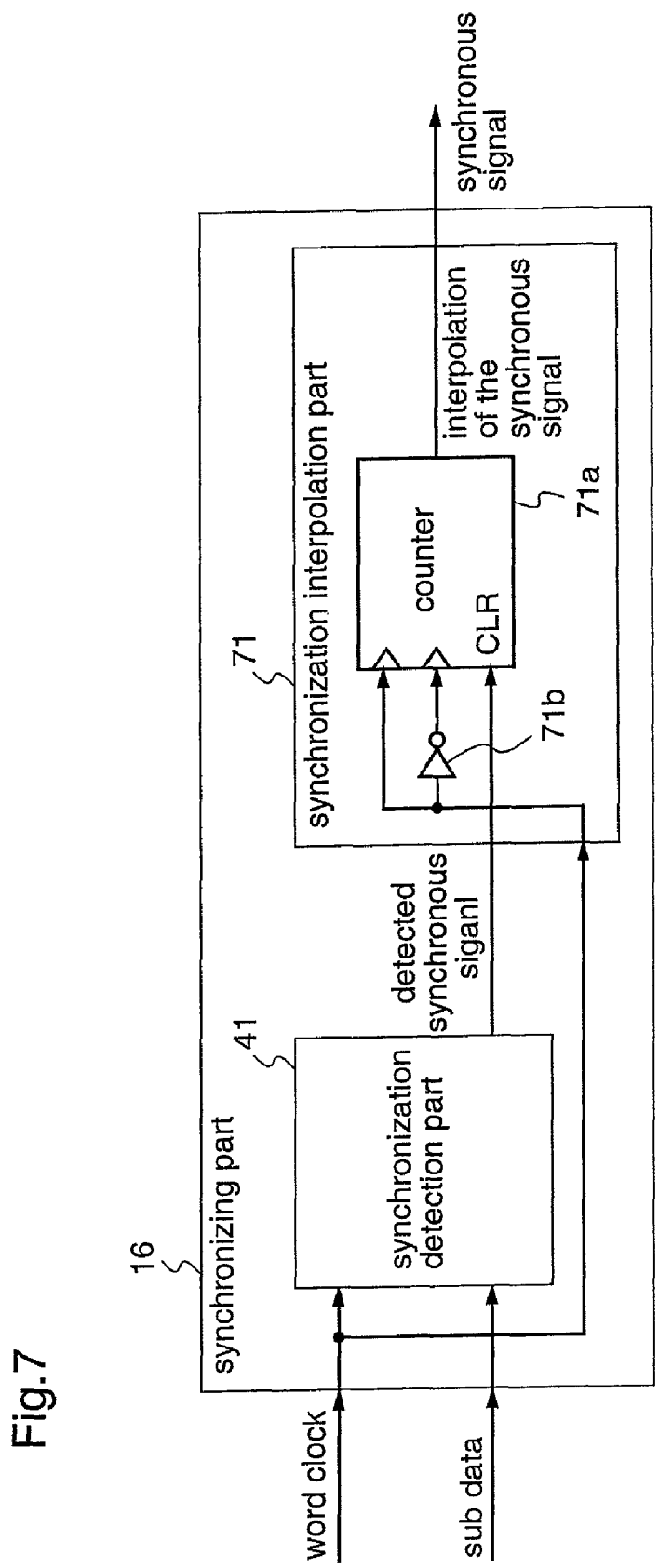
FIG. 7 is a diagram illustrating a third constitutional example of the synchronization part according to the first embodiment of the present invention.

The synchronization part 16 shown in FIG. 7 is constituted with a function of interpolating an address added to the synchronization part 16 shown in FIG. 4. While the synchronization part 16 shown in FIG. 4 is intended to generate a synchronous signal by detecting the specific pattern which is periodically included in the sub data, there may arise cases where the specific pattern lacks in the process of transferring the reproduced data or where the specific pattern cannot be detected caused by the errors occurring in the disc reproduction device 11. Particularly in a case of CD, though the main data can be restored from errors by the error correction, the sub code data cannot be corrected by the error correction, thereby resulting in lacking of a synchronous signal due to slight flaws, which, in turn, results in the incapability in performing buffering from the correct position.

The synchronization part 16 shown in FIG. 7 is intended to solve such disadvantages. This part is provided with a synchronization signal interpolation part 71 which interpolates the lacking synchronous signal on the basis of the detected synchronization signal that is detected by the synchronization detection part 41, and thereby the interpolation of the synchronous signal is carried out in the synchronous part 16.

Figure 8:
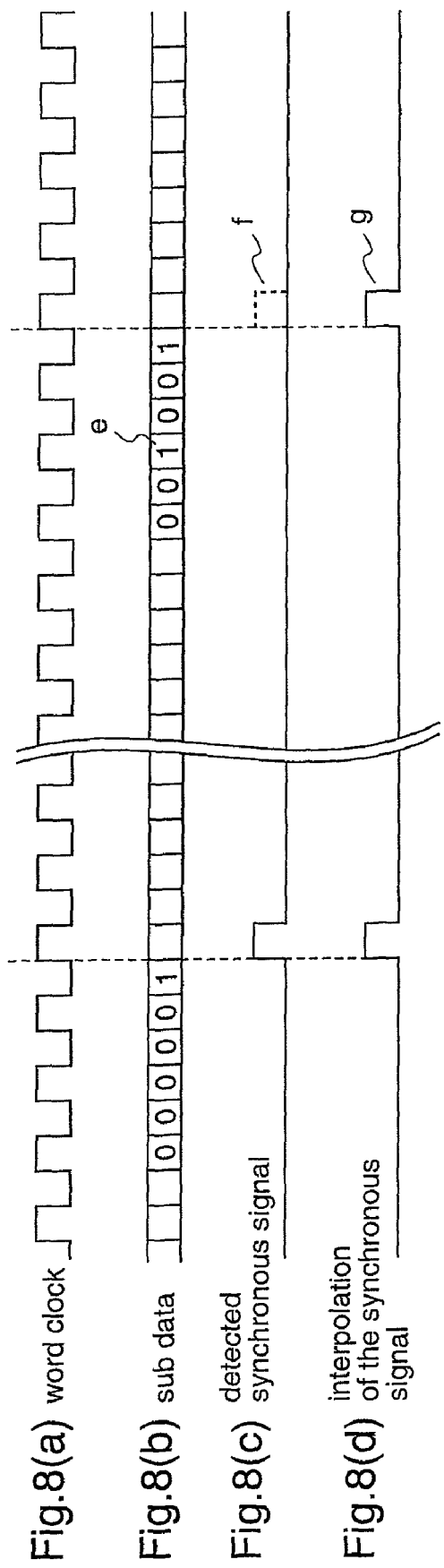
FIG. 8 is a diagram illustrating the timing for interpolating the synchronous pattern in the sub data.

For the synchronization part 41 shown in FIG. 7, one having the same construction as shown in FIG. 4 can be employed, and the description thereof omitted. As show in the timing chart of FIG. 8, when the error e is included in the sub data (b), the detected synchronous signal is not generated at the normal position f. Therefore, the synchronization interpolation part 71 shown in FIG. 7 makes the counter 71a operated by the word clock and the inverted word clock that is inverted by the inverter 71b with taking the once detected synchronous signal as a reference, thereby generating the interpolated synchronous signal g at periodic count positions. By utilizing this interpolated synchronous signal as a synchronous signal, even when the synchronization signal is actually not generated due to that errors are included in the sub data, the synchronization signal can be surely generated on appearance.

Figure 9:
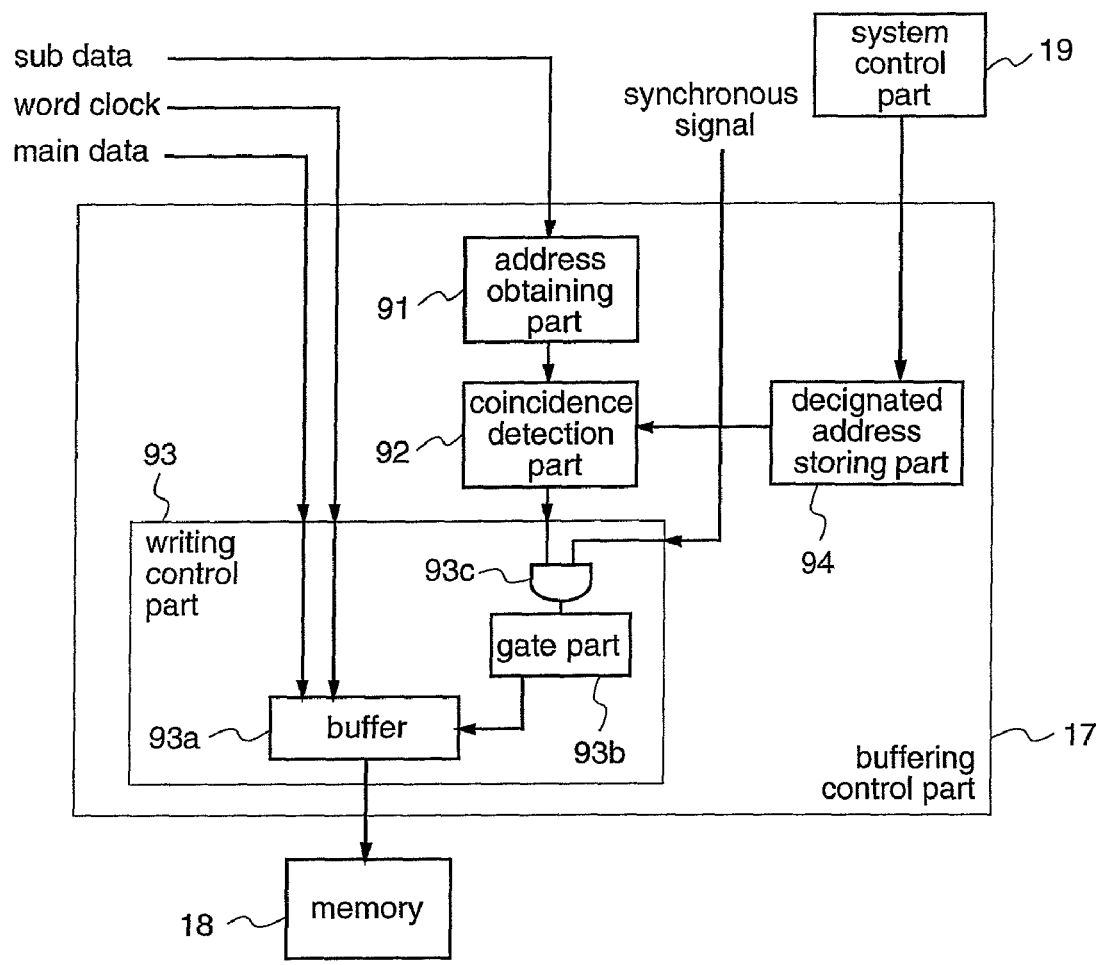
FIG. 9 is a diagram illustrating a construction example of the buffering control part in the first embodiment of the present invention.

FIG. 9 is a diagram illustrating a construction example of the buffering control part 17.

The buffering control part 17 includes the address obtaining part 91, the coincidence detection part 92, the writing in control part 93, and the designated address storing part 94.

The address obtaining part 91 is intended to obtain the address information which is included in the sub data. In a CD, the time information of the sub code Q data is utilized as address information. That is, by utilizing this address information in the buffering control part 17, the timing for starting buffering the received main data into the memory 18 can be selected similarly as when starting the CD reproduction in the disc reproduction device 11.

The coincidence detection part 92 is intended to judge whether the obtained address and the designated address which is described later coincide with each other or not. The writing in control part 93 is intended to control the writing in of the main data into the memory 18, and includes the buffer 93a for temporarily holding the main data from the receiving part 15, a gate part 93b for generating an allowance signal for allowing the writing in of the data, and a logic AND gate 93c which receives the coincidence signal from the coincidence detection part 92 and the synchronous signal as its inputs. The designated address storing part 94 is intended to store the designated address which indicates the buffering start timing which is previously set by the system control part 19, and for example, the top address of the music piece for which the dubbing is to be started is set by the system control part 19.

Next, the operation of the buffering control device 14 according to the first embodiment of the present invention constructed as described above will be described with reference to FIG. 10.

Figure 10:
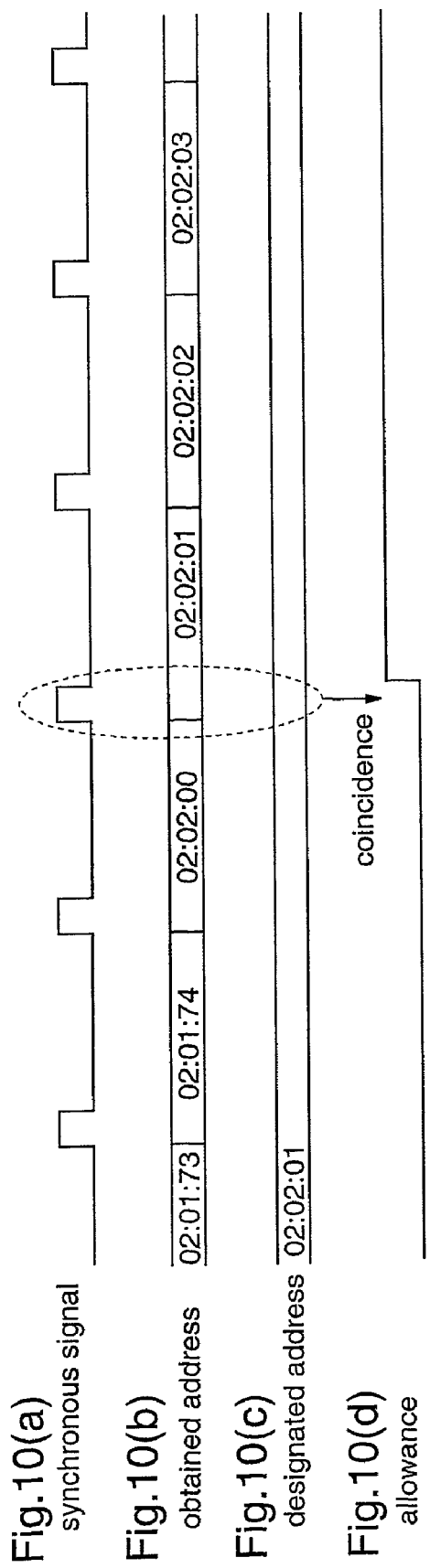
FIG. 10 is a diagram illustrating the generation timing of the allowance signal for explaining the operation of the buffering control part.

FIG. 10 illustrates a timing chart for explaining the operation of the buffering control device 14, where FIG. 10(a) shows the synchronization signal from the synchronization part 16, FIG. 10(b) shows the obtained address which is detected by the address obtaining part 91, FIG. 10(c) shows the designated address which is stored in the designated address storing part 94, and FIG. 10(d) shows the allowance signal for buffering which is outputted from the gate part 93b, respectively.

The main data which is outputted from the receiving part 15 is sent out to the writing control circuit 93 shown in FIG. 9 together with the word clock. On the other hand, the sub data is sent out to the synchronization part 16 and the address obtaining part 91, and the synchronization signal is generated on the basis of the sub data in the synchronization part 16, while the address information which is included in the sub data is taken out in the address obtaining part 91.

The obtained address which was obtained in the address obtaining part 91 was renewed at the period of the synchronous signal (a) as shown in FIG. 10(b). Then, the detection of the coincidence between the designated address (c) and the obtained address (d) is carried out in the coincidence detection part 92, and when the addresses coincide with each other, a coincidence signal is inputted to the writing in control part 93.

In the writing in control part 93, when the logic AND gate 93c receives the coincidence signal at the timing when the coincidence with the synchronous signal is detected, the gate part 93b outputs the allowance signal (d) which allows the buffering of the main data to the buffer 93a, and thereby the main data which was sent out from the receiving part 15 is outputted to the memory 18, and the buffering from the correct address position is started with making the word clock as a reference.

As described above, according to the buffering control device according to the first embodiment of the present invention, the synchronous signal which is synchronized with the main data is generated from the sub data which is sent out from the disc reproduction device, the address information which is included in the sub data is successively obtained on the basis of this synchronization signal, and the buffering of the main data is started when the designated address indicating a desired buffering start timing and the obtained address coincide with each other. Thereby, the buffering from the correct position can be carried out, and thereby the problem of sound lacking at the top of the music piece which was occurring in the conventional construction can be solved.

Further, since when the lacking of the synchronous signal occurs in the transfer process of data or in the disc reproduction device, the synchronous signal was interpolated by the synchronization interpolation part in the buffering control device, the synchronization signal can be surely generated, and the buffering control can be performed stably.

Embodiment 2

The buffering control device according to a second embodiment of the present invention is intended to perform interpolation of address in the address obtaining part in the buffering control part 17 thereby to interpolate the lacking address.

More particularly, while in the buffering control device of the above-described first embodiment the address obtaining part 91 in the buffering control part 17 is intended to obtain the address information which is included in the sub data, there may arise cases where the address information cannot be detected due to errors in the disc reproduction device 11 or errors in the transfer process from the disc reproduction device 11, similarly as that the synchronous signal cannot be detected due to errors in the disc reproduction device 11 or errors in the transfer process from the disc reproduction device 11. In such case, if the comparison address for detecting the coincidence with the designated address is forfeited, the coincidence signal is not generated at the point where the buffering is to be started, and thereby the buffering is not started.

The buffering control device according to the second embodiment of the present invention is intended to interpolate the address as described above thereby to interpolate the lacking address, resulting in solving the problem.

Figure 11:
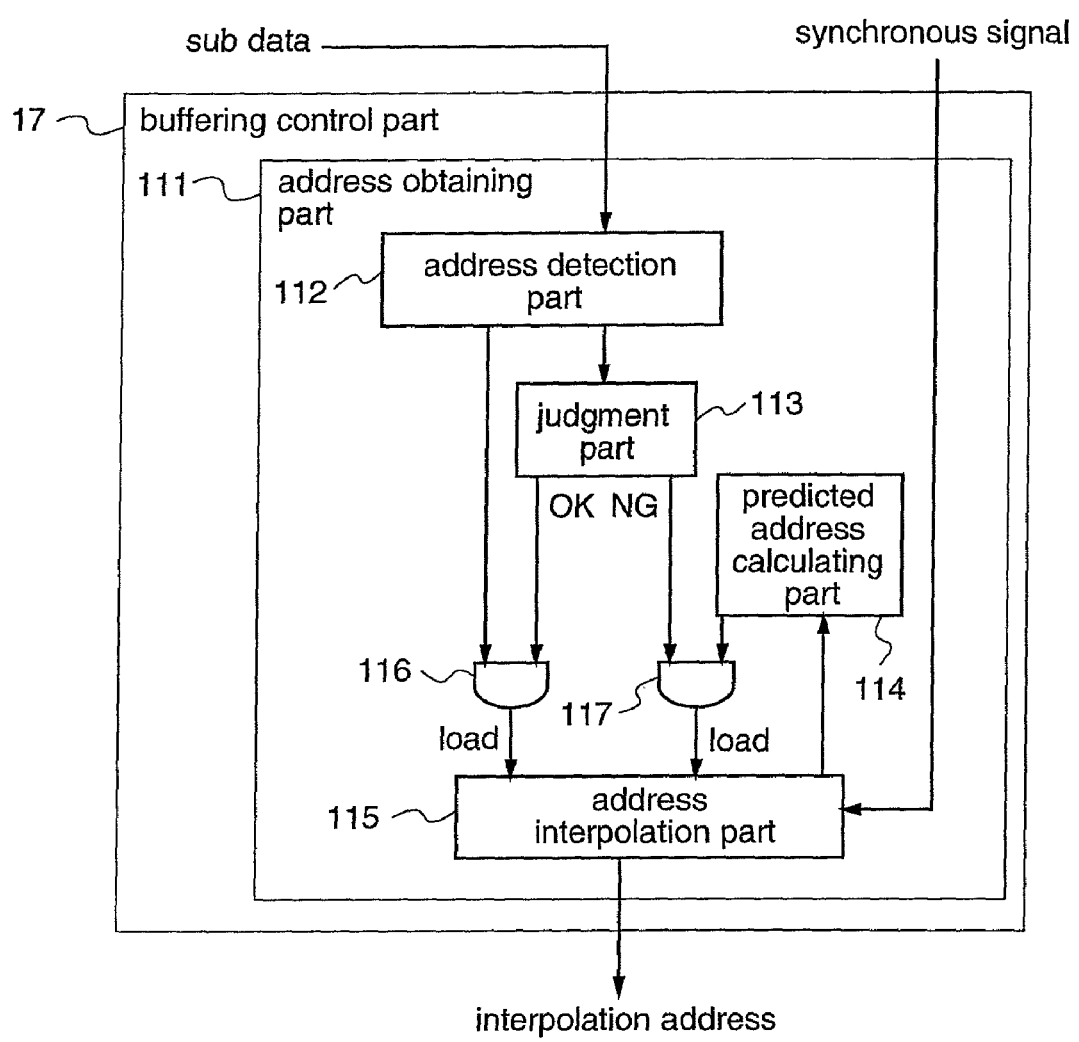
FIG. 11 is a diagram illustrating a construction example of the address obtaining part in the second embodiment of the present invention.

FIG. 11 is a diagram illustrating a construction of the address obtaining part 111 in the buffering control device according to the second embodiment of the present invention. The constitutional elements of the buffering control device 14 other than the address obtaining part 111 are the same as those in the first embodiment of the present invention.

The address obtaining part 111 includes an address detection part 112, a judging part 113, a prediction address calculating part 114, an address interpolation part 115, and logic gates 116 and 117.

Hereinafter, the operation of the address obtaining part 111 in the buffering control part 17 in the buffering control device according to the second embodiment of the present invention will be described with reference to the timing chart shown in FIG. 12.

Figure 12:
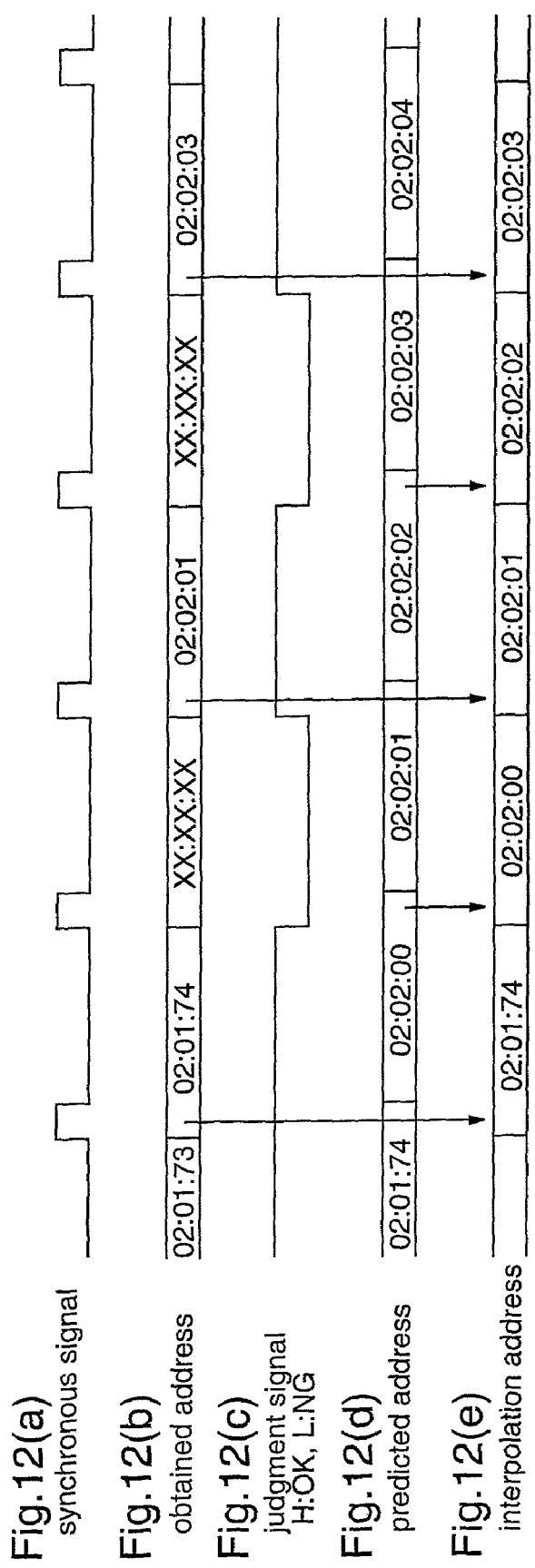
FIG. 12 is a diagram illustrating address insertion timings for explaining the operation of the address obtaining part.

Among FIG. 12, FIG. 12(a) shows the synchronous signal from the synchronizing part 16 in the buffering control device 14, FIG. 12(b) shows the obtained address which is detected by the address detection part 112, FIG. 12(c) shows the judgment signal which is outputted from the judging part 113, FIG. 12(d) shows the predicted address which is outputted from the prediction address calculating part 114, and FIG. 12(e) shows the interpolation address after the address interpolation performed, respectively.

The address detection part 112 shown in FIG. 11 is intended to, when it has obtained as address information the address of "02:01:74" from the sub data which is transmitted from the transmission part 15 in the buffering control device 14 as shown in FIG. 12(b), transmits the obtained address to the judging part 113. The judging part 113 judges the existence or non-existence of errors in the obtained address. This judgment can be carried out, for example, by a CRC check in a case of sub code Q data in CD.

When it is judged as OK in the judging part 113, the obtained address "02:01:74" is loaded to the address interpolation part 115 via the logic AND gate 116.

Next, the address detection part 112 obtains the next address from the sub data, and transmits same to the judging part 113. Then, when there has occurred an error in the obtained address as shown in FIG. 12(b), it is judged as there being an error by the judgment part 113, and a judgment signal indicating judgment NG is outputted as shown in FIG. 12(c). In the prediction address calculating part 114, the value of the address "02:01:74" which is obtained by the address interpolation part 115 is incremented to calculate the predicted address "02:02:00" that is lacking, and when the judgment NG is outputted from the judgment part 112, the predicted address "02:02:00" is loaded to the address interpolation part 115 via the logic AND gate 117 as shown in FIG. 12(e).

In this way, loading of any of the obtained address and the predicted address successively occurs on the basis of the synchronous signal, and the interpolation address which includes no lacking address is outputted from the address interpolation part 115. Accordingly, even when an error is included in the sub data, the interpolation address can be employed as the comparison address which coincides with the designated address, and thereby the buffering can be surely started at the designated address.

Here, the buffering control part 14 in the buffering control device according to the second embodiment of the present invention can be applied to the shock proof control as described below. That is, in the buffering control part 130 shown in FIG. 13, the writing in control part 93 outputs the writing in completion signal in a block unit, the address obtaining part 91 outputs the judgment OK signal, and the designated address storing part 94 receives a writing in completion signal in a block unit from the writing control pat 91 as well as a judgment OK signal from the address obtaining part 91.

In the buffering control part 130 having such a construction, when the buffering into the memory is designed to be performed in an address block unit based on the synchronous signal in the sub data, it is possible to automatically renew the designated address in the designated address storing part 94 when making the writing in data effective.

Then, if the synchronous signal in the sub data is in synchronization in a sample unit which is partitioned by the word clock of the main data, the address which is stored in the designated address storing part 94 when the buffering is temporarily halted serves as the connection address when again performing buffering from the temporal buffering halted state, and thus the data can be connected on the memory 18.

Accordingly, such as the address control at the shock proof control which was conventionally carried out at the side of the disc reproduction device 261 side can be realized by the buffering control part 130, thereby realizing rationalization of the system.

According to the buffering control device of the second embodiment of the present invention, since when there arises lacking in the obtained address due to errors in the disc reproduction device or errors in the transfer process from the disc reproduction device 11, the lacking address is interpolated using the predicted address, the address information can be surely generated, thereby enabling performing the buffering control stably.

Embodiment 3

The buffering control device according to a third embodiment of the present invention is intended to detect the abnormality of the reproduced data on the basis of the sub data in the buffering control device, thereby enabling to automatically halt the buffering without passing through any processing by the system control part.

More particularly, when there arises an error in the reproduced data in the disc reproduction device or in the data transfer path during buffering the main data, it is not possible to judge this occurrence of error based on the main data, and therefore, it was general that the buffering is halted when the content of the sub data is confirmed by the system control part 19 or when the abnormality of the reproduced data is judged on receipt of the error notification from the disc reproduction device. However, due to that the system control part carries out the abnormality judgment and the buffering halting processing at the abnormality detection, the load to the whole system would have unfavorably increased.

The buffering control device according to the third embodiment of the present invention is intended to solve this problem by detecting the abnormality of the reproduced data on the basis of the sub data in the buffering control device as described above.

Figure 14:
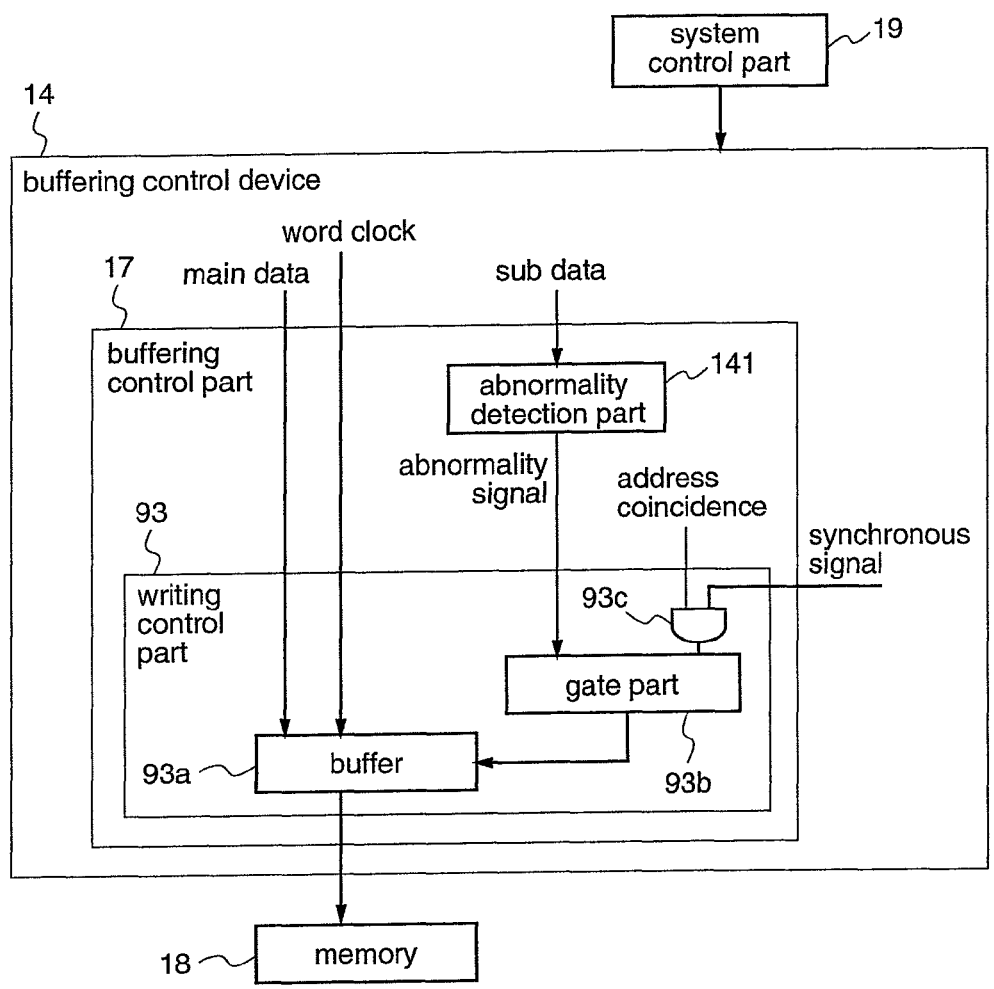
FIG. 14 is a schematic diagram illustrating a construction which automatically halts the writing allowance in the buffering control in the third embodiment of the present invention.
Figure 15:
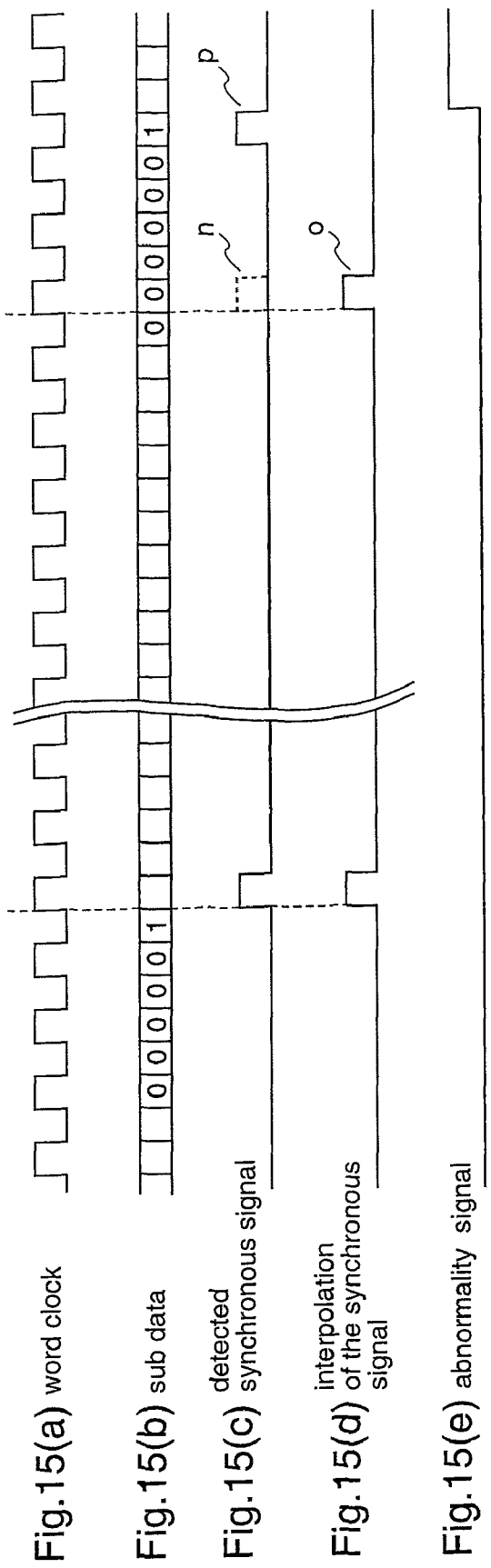
FIG. 15 is a diagram illustrating the timing for detecting the periodic abnormality based on the synchronous pattern.

FIG. 14 is a construction diagram illustrating a buffering control device according to the third embodiment of the present invention.

In the buffering control device of this third embodiment, there is provided an abnormality detection part 141 which detects the abnormality of the reproduced data on the basis of the sub data in the buffering control part 17 in the buffering control device of the first or the second embodiment, and when the abnormality of the reproduced data is detected by the abnormality detection part 141, the writing in of the main data into the memory 18 is halted. Thus, the buffering is automatically halted without requiring the processing by the system control part 19, thereby resulting in reduction in the burden to the processing by the system control part 19.

Hereinafter, a description is given of a concrete method of performing the abnormality detection of the reproduced data from the sub data and automatically halting the buffering according to the third embodiment of the present invention.

While in the buffering control devices according to the first and the second embodiment of the present invention described above, the synchronous signal which is detected from the sub data which is received from the disc reproduction device 11 can be detected at the period of a predetermined number of word clocks in the normal state, if the synchronous signal is detected at a position other than the period of a predetermined number of word clocks, it is predicted that any error has occurred in the disc reproduction device 11, and it can be judged as the main data having a low reliability in its data content.

This periodic disturbance in the synchronous signal can be detected on the basis of the detected synchronous signal in the synchronization interpolation part 71 in the synchronization part 16, and when the synchronous signal is not detected at its proper position n but is detected at an irregular position p after the interpolation synchronous signal is generated at the regular position o, an abnormality signal is generated and is outputted to the gate part 93b in the writing in control part 93. The gate part 93b makes the buffer 93a halt the buffering when it receives the abnormality signal as well as the address coincidence signal and the synchronous signal as the inputs of the logic AND gate 93c become "H" simultaneously. Thereby, the system control part 19 can automatically halt the buffering without judging the abnormality of the reproduced data.

In addition, in the buffering control device 14 of this second embodiment, the parity check is performed in the judging part 113 in the address obtaining part 111 to detect the error judged state as abnormality state, thereby enabling to halt the buffering automatically.

In this case, however, when the CRC check of the sub data Q check in CD is applied, there may be a case where the error judgment is performed by flaws in a disc while the main data may be normal by being subjected to the error correction. Therefore, as judgment criterion for errors, it is preferred that it is judged as an abnormality signal should be generated for halting the buffering only when the NG judgment has continued a plurality of times.

Figure 16:
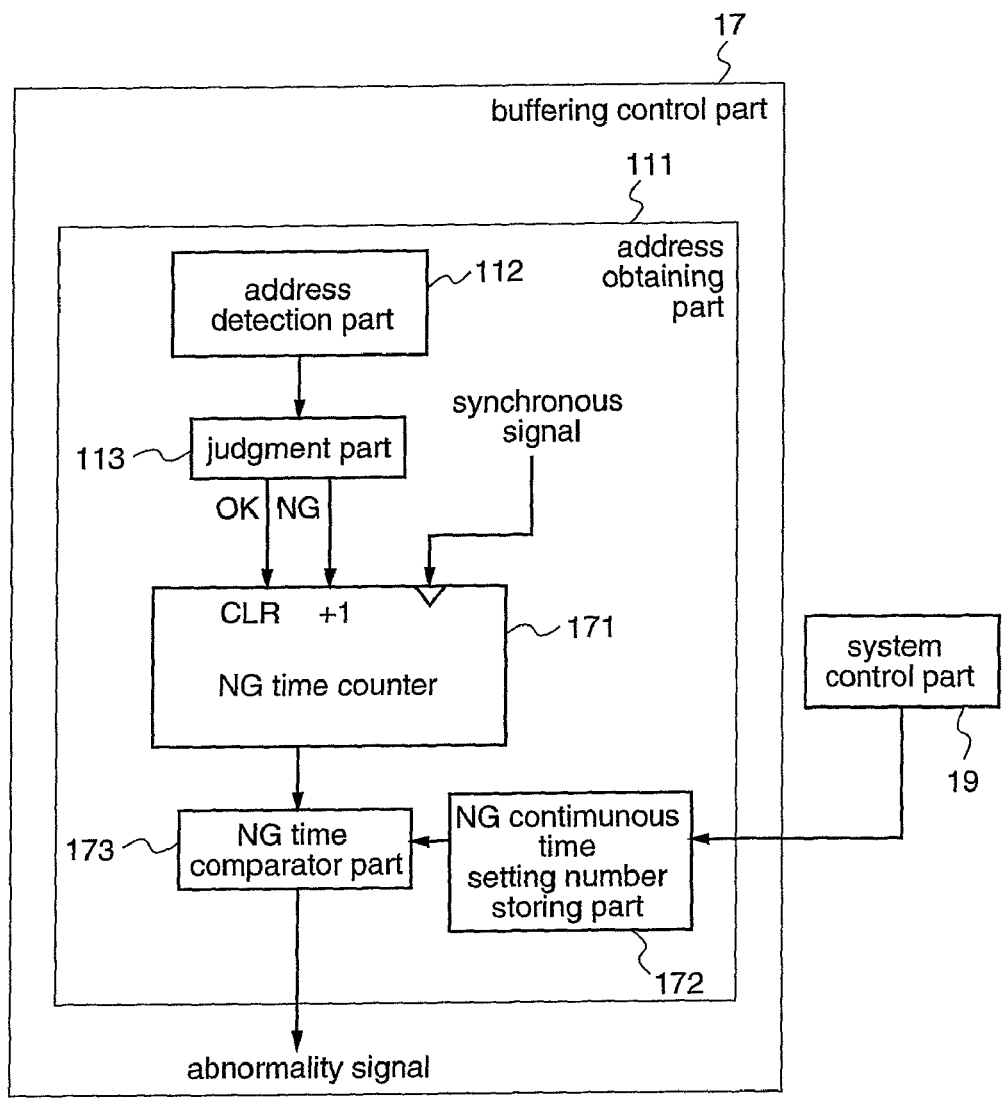
FIG. 16 is a diagram illustrating a construction of a main part of the address obtaining part in the third embodiment of the present invention.

For example, as shown in FIG. 16, there is provided an NG time number counter 171 at the later stage of the judging part 113, which, being operated at the timing of the synchronous signal, clears the result of the CRC which is received from the judging part 113 when it is OK, while counts up that value by +1 when it is NG. Further, the value of the NG time number counter 171 and the NG continuous time number which is previously set in the NG continuous time number setting value storing part 172 by the system control part 19 are compared by the NG time number comparison part 173, and when they coincide with each other, an abnormality signal is outputted to the gate part 93b in the writing in control part 93. Thereby, it is possible to automatically halt the buffering without passing through the system control part 19 only when the NG judgment has continued a plurality of times.

Figure 17:
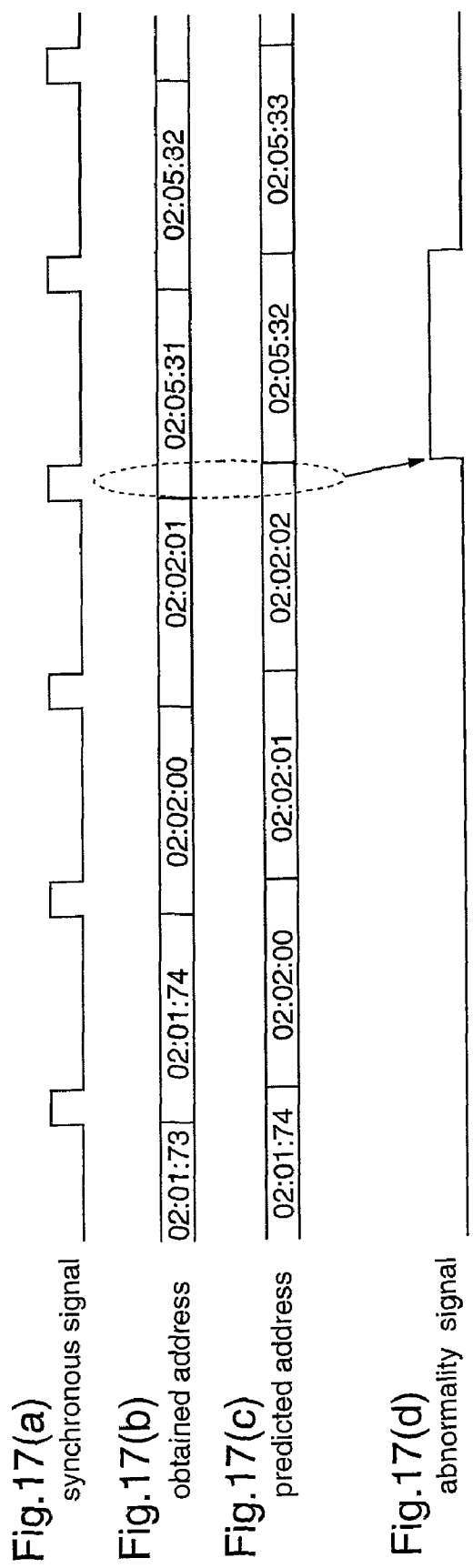
FIG. 17 is a diagram illustrating the timing for detecting the abnormality in the continuity of addresses.

In addition, in the buffering control device 14 of this second embodiment, by detecting the abnormality state when the in-coincidence between the obtained address and the predicted address is detected as shown in the timing chart of FIG. 17 in the address interpolation part 115 in the second embodiment with utilizing that the obtained address which was obtained from the sub data which was received from the disc reproduction device 11 is an incremented address in the normal state, the buffering can be automatically halted.

Further, in a case where the disc reproduction device 11 is constructed to transfer the error which has occurred in the disc reproduction device 11 with adding the error to the sub data from the transmission part 13 in the buffering control device of the first or the second embodiment, it is also possible to automatically halt the buffering by obtaining the error signal from the sub data which was received by the receiving part 15 and outputting same as the abnormality signal to the gate part 93b in the writing in control part 93.

According to this construction, it is possible to instantaneously halt the buffering when an error such as a focus error or a tracking error which provides clear abnormality even to the main data has occurred. This halting processing can be realized without passing through the system control part 19, and thereby the processing burden to the system control part 19 can be reduced similarly as in the above-described methods.

Figure 13:
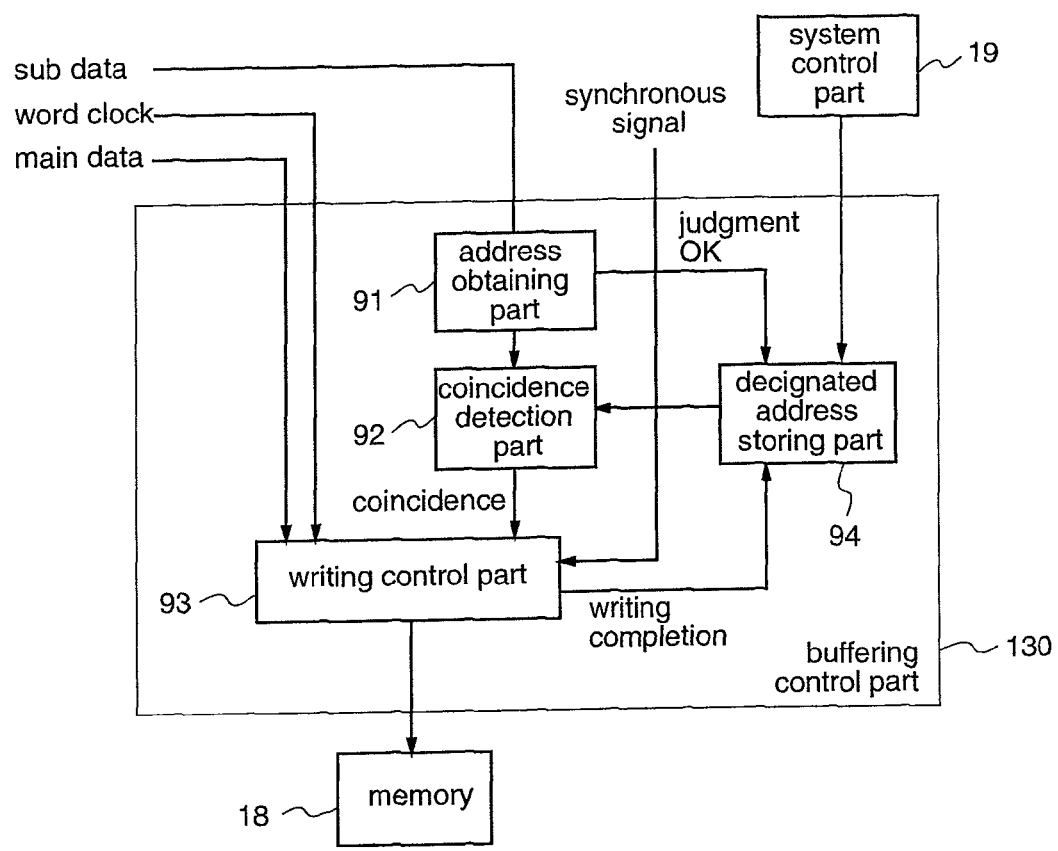
FIG. 13 is a construction diagram in a case where the buffering control part in the second embodiment of the present invention is applied to the shock proof control.

In addition, by combining the buffering control device 130 which automatically renews the designated address as shown in FIG. 13 in the second embodiment with the buffering control device which automatically halts the buffering in the third embodiment, it is possible to implement the shock proof control which is required to be performed at the side of the disc reproduction device 11 at the side of the buffering control part. In this case, no particular mechanism for performing a shock proof control is required to be provided at the side of the disc reproduction device 11 as well as the writing in control part 93 and the designated address storing part 94 for automatically renewing the designated address in FIG. 13 can be installed in the same semiconductor device as for the buffering control part 17 in this third embodiment, thereby enabling rationalization of the whole system which results in cost reduction to a great extent.

As described above, according to the third embodiment of the present invention, since the abnormality of the reproduced data is detected on the basis of the sub data by the abnormality detection part in the buffering control device, and when the abnormality is detected, the buffering is hated, the buffering can be automatically halted when abnormality has occurred in the reproduced data without the system control part performing a halting operation, thereby reducing processing to be performed by the system.

Embodiment 4

The buffering control device according to a fourth embodiment of the present invention is intended to transfer also the main data itself in a parallel form when transferring the reproduced data, the word clock, and the bit clock by the three serial data transmission lines, thereby reducing the speed of bit clock and enhancing the anti-noise property even when the increase in the speed of multiple speed for data dubbing has advanced.

Figure 18:
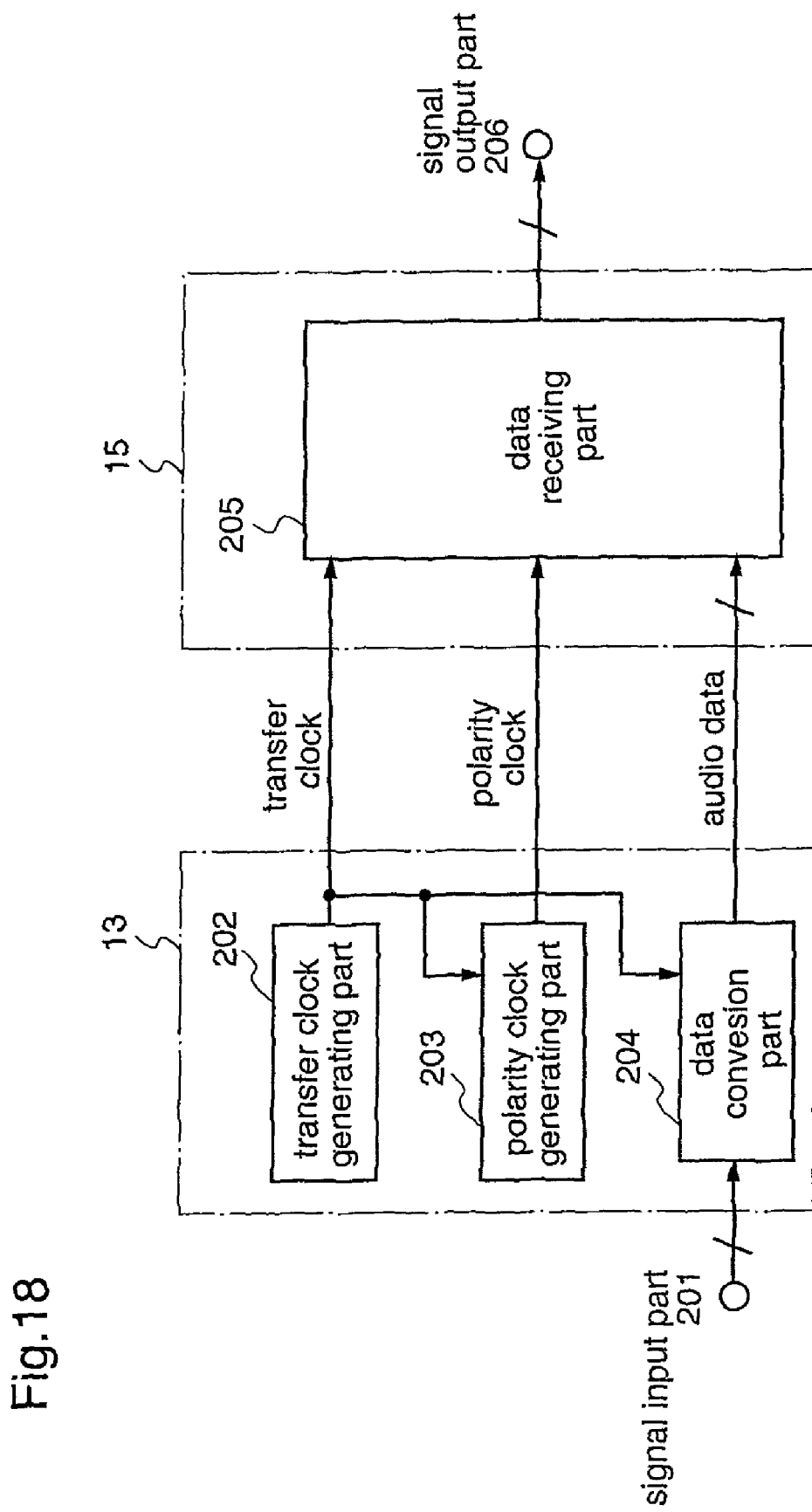
FIG. 18 is a diagram illustrating a construction of a data transfer device according to a fourth embodiment of the present invention.

FIG. 18 is a diagram illustrating a block construction of a data transfer device according to the fourth embodiment of the present invention.

In FIG. 18, reference numeral 201 denotes a signal input part for inputting the audio data to be transferred, which receives the main data and the sub data from the reproduction part 12 in the disc reproduction device 11 shown in FIG. 1 as its input.

In addition, reference numeral 202 denotes a transfer clock generation part which generates a transfer clock (bit clock) which is corresponded to the bit width per a sample of the audio data and the line number of the data lines. Numeral 203 denotes a polarity clock generation part which generates the polarity clock (word clock) indicating left and right channel information which corresponds to the data being transferred concerning the two channel audio data. Numeral 204 denotes a data conversion part which, when the audio data of two channels are inputted, performs a predetermined conversion which corresponds to the bit width per a sample of the audio data and the line number of the data lines, and outputs the audio data of two channels in synchronization with the polarity clock and also in synchronization with the transfer clock with a bit unit. These constitutional elements constitute the transmission part 13 in the disc reproduction device 11 shown in FIG. 1.

In addition, reference numeral 205 denotes a data receiving part which, when it receives the transfer clock as its input, extracts the data of two channels denoted by the polarity clock and performs a conversion that is reverse to the predetermined conversion for the extracted audio data to output two channels audio data, and this constitutes the receiving part 15 in the buffering control device 14 shown in FIG. 1.

In addition, reference numeral 206 denotes a signal outputting part for outputting audio data which was received and extracted by the receiving part 205, and this part outputs the main data to the buffering control part 17 shown in FIG. 1 and the sub data to the synchronization part 16, respectively.

Next, the operation of the audio data transfer device according to the fourth embodiment of the present invention constituted as above will be described with reference to FIGS. 18 and 19.

Figure 19:
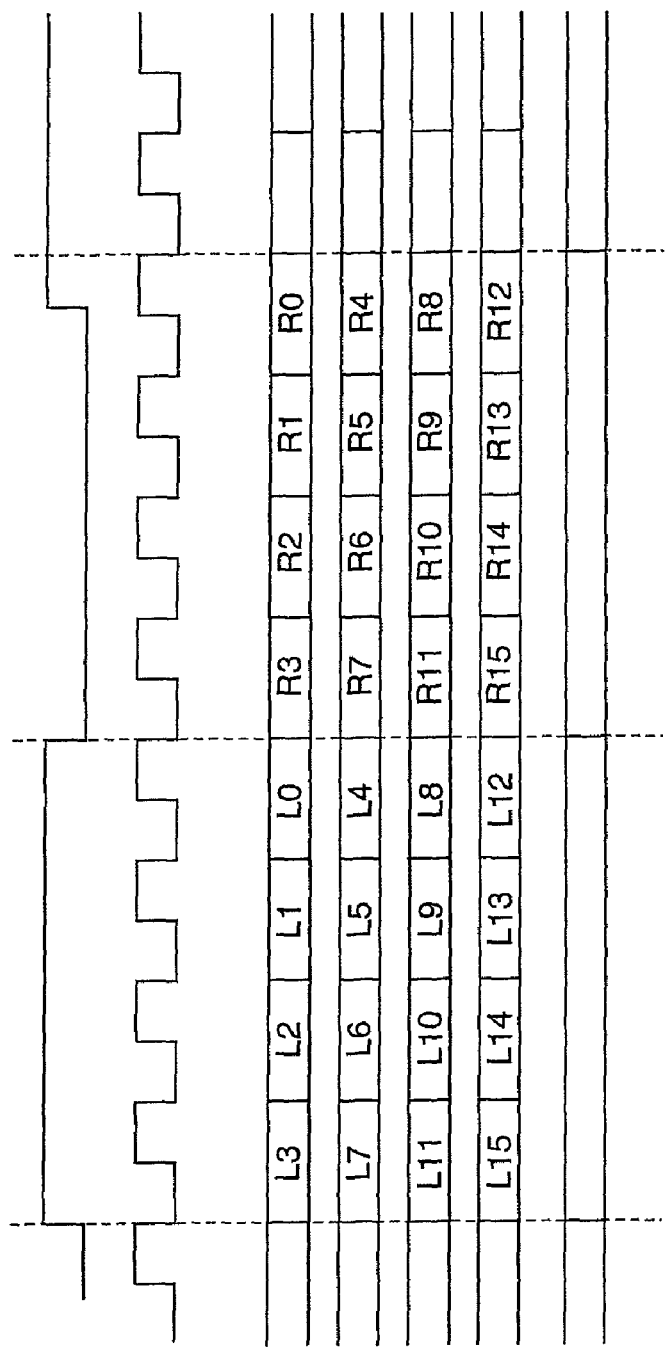
FIG. 19 is a diagram illustrating the format of the data which is transferred by the fourth embodiment of the present invention.

FIG. 19 shows an example of a format in which the sub data is transferred in a separate path from the main data, and this makes it possible to transfer the sub data and the main data in a parallel form and enables the increase in the speed of multiple speed of data transfer.

In FIG. 19, the polarity clock shows the word clock signal which is generated by the polarity clock generating part 203, and in this fourth embodiment the L channel is represented by the High level and the R channel is represented by the Low level. In addition, the transfer clock is represented by the bit clock signal which is outputted from the transfer clock generating part 202. In addition, the audio data is the signal which is outputted from the data conversion part 204, and it is recited as the bit width of the audio data being 16 bits and the data lines being four lines. In addition, the sixteen bits of the L channel in the audio data are represented as L15 to L0, respectively, and the sixteen bits of the R channel are represented as R15 to R0, respectively.

At first, the audio data of 16 bits to be transferred is inputted to the signal inputting part 201. A polarity clock having a polarity which is in accordance with whether the inputted data is of L channel or R channel is generated in the polarity clock generating part 203 and is outputted.

Simultaneously, the transfer clock generating part 202 generates and outputs the transfer clocks on the basis of the bit width per a sample of the audio data to be transferred and the line number of the data lines. Then, since the line number of the data lines is four, if there are four transfer clocks per a channel, the transfer of 16 bits audio data is possible. Then, it is controlled such that there are four transfer clocks per a channel.

Simultaneously, the data conversion part 204 generates and outputs audio data on the basis of the bit width per a sample of the audio data to be transferred and the line number of the data lines. When the 16 bits audio data are transferred on four lines of data lines, the data are respectively divided into L15 to L12, L11 to L8, L7 to L4, L3 to L0, R15 to R12, R12 to R8, R7 to R4, and R3 to R0, respectively, and are outputted synchronized with the polarity clock and the transfer clock, respectively.

The data receiving part 205 receives the polarity clock and the audio data which are respectively outputted from the polarity clock generating part 203 and the data conversion part 204, respectively, in synchronization with the transfer clock which is outputted from the transfer clock generating part 202, perform a conversion that is reverse to the conversion which is carried out by the data conversion part 205 so as to receive the original sixteen bits audio data and output same from the signal outputting part 206.

Figure 20:
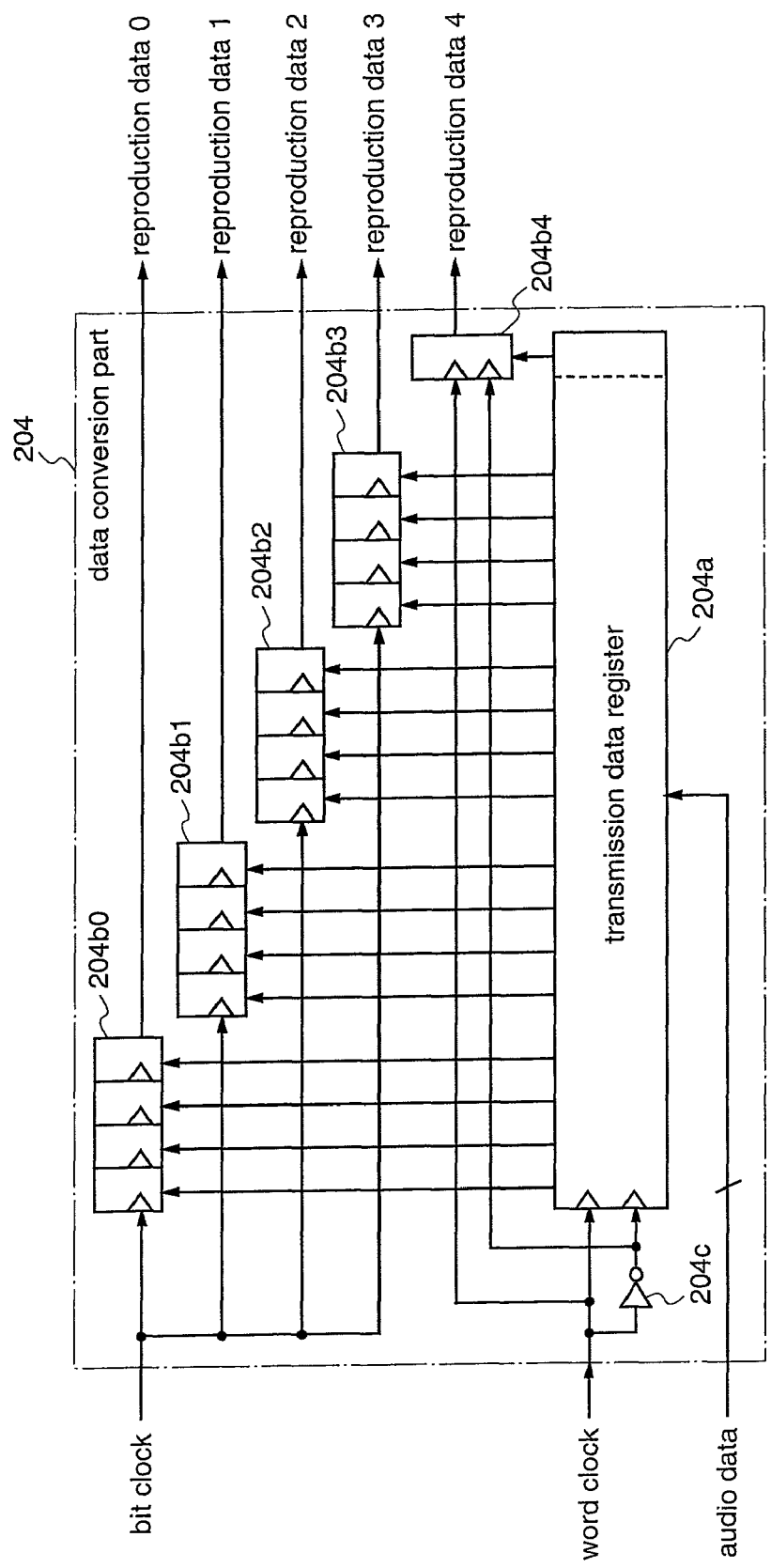
FIG. 20 is a diagram illustrating a construction example of a data conversion part in a fourth embodiment of the present invention.
Figure 21:
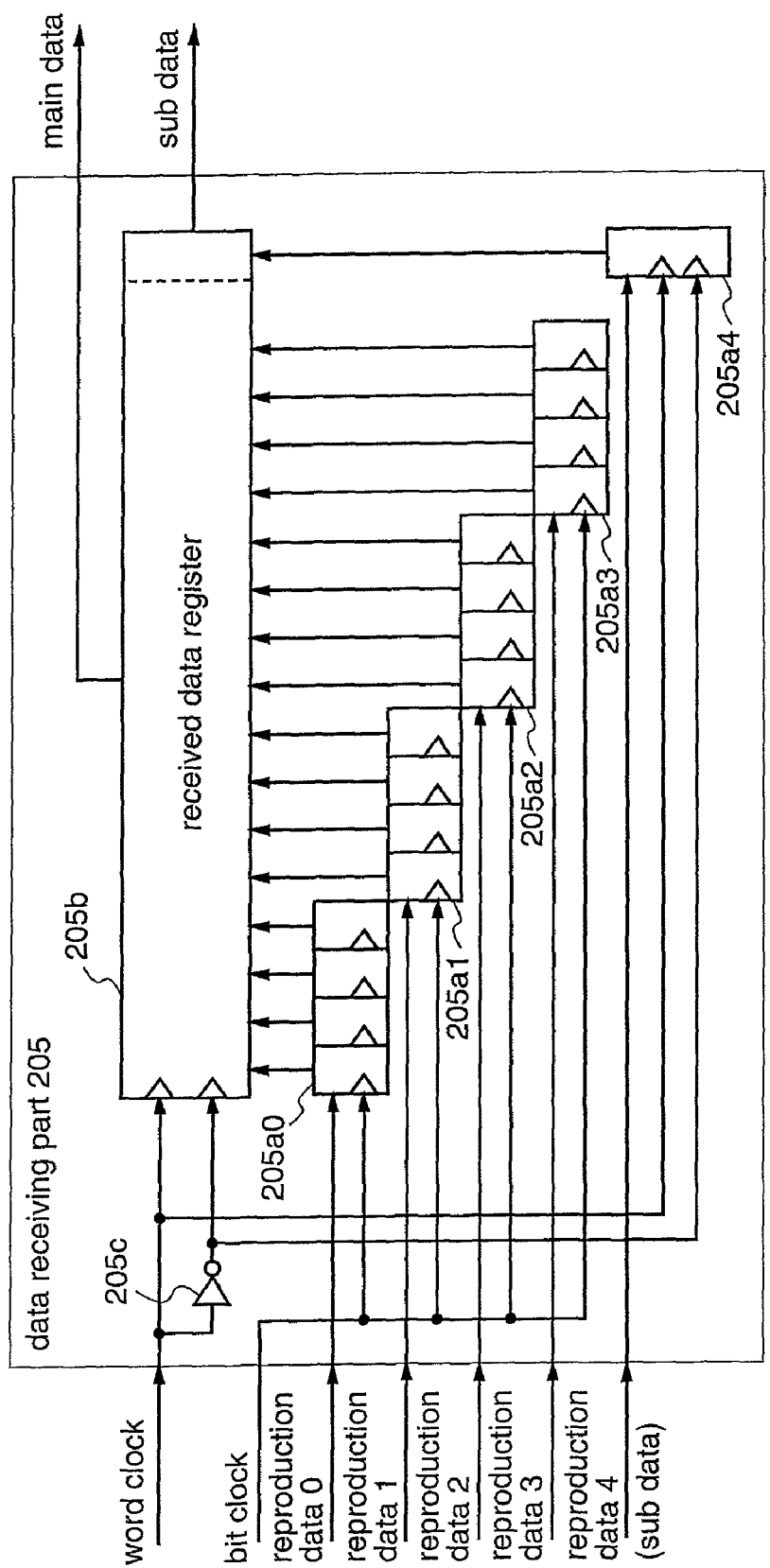
FIG. 21 is a diagram illustrating a construction example of a data receiving part in the fourth embodiment of the present invention.

As the data conversion part and the receiving part which correspond to the transfer format shown in FIG. 19, those which are shown in FIG. 20 and FIG. 21 are considered, respectively.

More particularly, the transmission data register 204a which is included in the data conversion part 204 shown in FIG. 20 takes in the audio data each time when the word clock is inverted by employing the word clock and its inverted clock that is generated by an inverter 205c as clocks. This audio data comprises one bit sub data and the sixteen bits main data. The main data are transferred to the four bit length shift registers 204b0, 204b1, 204b2, and 204b3, and from the four bit length shift registers 204b0, 204b1, 204b2, and 204b3, the reproduced data 0, reproduced data 1, reproduced data 2, and reproduced data 3 are successively outputted synthesized with the bit clock. In addition, separately from this, the sub data is transferred to the one bit length register 204b4, and it is outputted as reproduced data 4 with synchronized with the word clock and its inverted block.

In addition, the four bit length shift registers 205a0, 205a1, 205a2, and 205a3 which are included in the receiving part 205 shown in FIG. 21 successively receive the reproduced data 0 to 4 which were successively inputted thereto synchronized with the bit clock, and successively shift the same therein, and when the data of four bits are stored, they transfer the stored data from the parallel output to the reception data register 205b. In addition, separately from this, the reproduced data 4 (sub data) is stored in the one bit length register 205a4 synchronized with the word clock and its inverted clock, and it is transferred to the reception data register 205b as its top bit data. The reception data register outputs its top bit as sub data to the synchronization part 16 while outputs the remaining data as main data to the buffering control part 17. Here, the reception data register 205b employs the word clock and its inverted clock inverted by the inverter 205c as clocks.

Accordingly, while since in the first to the third embodiments the sixteen bits main data is transmitted on a line, a bit clock as a transfer clock for transferring the data is required to be one of a high speed, and when the increase in the speed of multiple speed of the data dubbing advances, it would result in problems in the anti-noise property, in this fourth embodiment in which the 16 bits main data are transmitted on four lines the speed of the transfer clock for transferring the data can be reduced, and the problem in the anti-nose property can be solved.

While in the above-described fourth embodiment the audio data is constructed in the bit width of 16 bits, the bit width of the audio data may be 20 bits, 24 bits, or other than those.

Further, while the number of the data lines is constituted as four lines, two or more data lines may be employed with the same effects as described above.

Further, while in the above described fourth embodiment the bit position to be outputted employed in the conversion of the audio data is described with the format shown in FIG. 19, the bit position to be outputted may be constituted in the other format with the same effects as described above.

As described above, according to the audio data transfer device of the fourth embodiment of the present invention, the audio data is transferred in parallel on the plural data lines of the number which is less than the bit width per a sample of the audio data to be transferred, the reduction in the speed of the transfer clock for transferring the audio data can be accomplished so as to easily realize the high multiple speed transfer of the audio data. In addition, in a case where it is needed to transfer the audio data at a higher speed, the problem that the transfer clock is likely subjected to the noises can be solved, thereby enabling performing buffering from the correct position when performing dubbing of the digital data.

Embodiment 5

Figure 22:
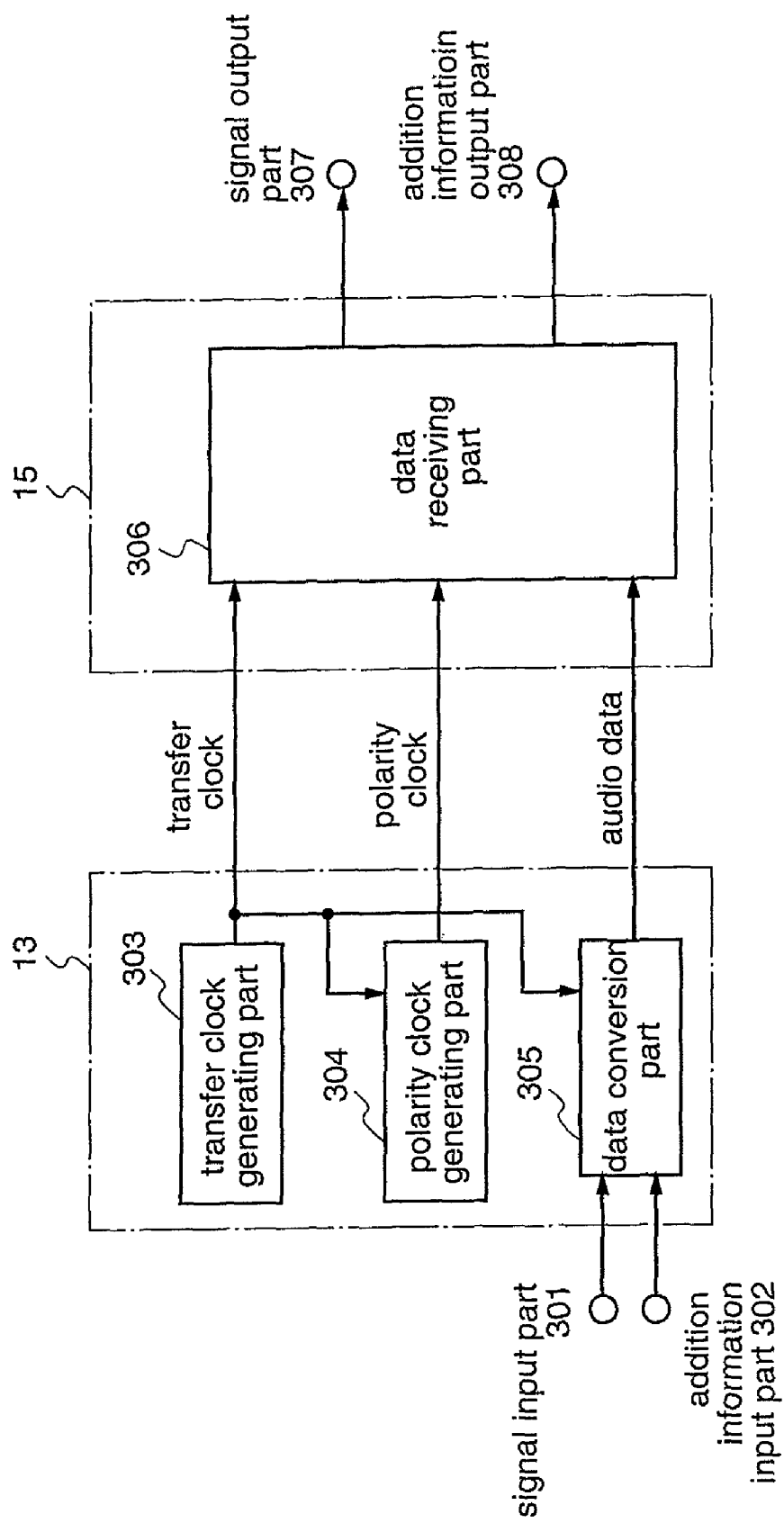
FIG. 22 is a diagram illustrating a construction example of a data transfer device according to a fifth embodiment of the present invention.

FIG. 22 is a diagram illustrating a block construction example of an audio data transfer device according to a fifth embodiment of the present invention.

In FIG. 22, reference numeral 301 denotes a signal input part for inputting the audio data to be transferred. Numeral 302 denotes an addition information input part for inputting the addition information when transferring the audio data. Numeral 303 denotes a transfer clock generation part which generates a transfer clock which is corresponded to the bit width per a sample of the audio data and the line number of the data lines. Numeral 304 denotes a polarity clock generating part which generates the polarity clock indicating the channel information which corresponds to the data being transferred concerning the two channel audio data. Numeral 305 denotes a data conversion part which, when the audio data of two channels are inputted, performs a predetermined conversion which corresponds to the bit width per a sample of the audio data and the line number of the data lines, and outputs audio data of two channels in synchronization with the polarity clock and also in synchronization with the transfer clock with a bit unit. Numeral 306 denotes a data receiving part which, when it receives the transfer clock as its input, extracts the data of two channels denoted by the polarity clock and an addition information, and perform a conversion that is reverse to the predetermined conversion for the extracted audio data to output two channels audio data. Numeral 307 denotes a signal outputting part for outputting audio data which was received and extracted by the data receiving part 205. Numeral 308 denotes an addition information outputting part for outputting the addition information which was received and extracted by the data receiving part 306.

Next, the operation of the audio data transfer device according to the fifth embodiment of the present invention constituted as described above will be described with reference to FIGS. 22 and 23.

Figure 23:
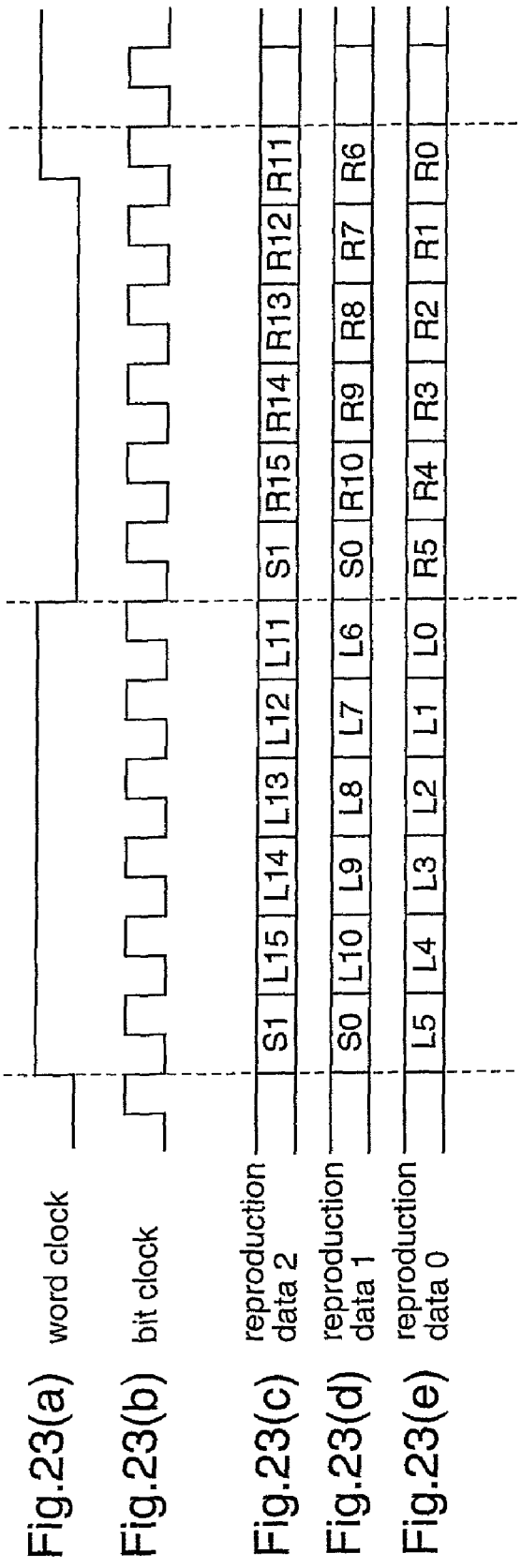
FIG. 23 is a diagram illustrating the format of the data which is transferred in the fifth embodiment of the present invention.

In FIG. 23, the polarity clock shows the word clock signal which is generated by the polarity clock generating part 304, and in this fifth embodiment the L channel is represented by the High level and the R channel is represented by the Low level. In addition, the transfer clock is represented by the bit clock signal which is outputted from the transfer clock generating part 303. In addition, the audio data is the signal which is outputted from the data conversion part 305 and it is recited as the bit width of the audio data being 16 bits and the data lines being three lines. In addition, the sixteen bits of the L channel in the audio data are represented as L15 to L0, respectively, and the sixteen bits of the R channel are represented as R15 to R0, respectively. In addition, the empty bits while transferring the sixteen bits audio data are made S0, S1, respectively.

At first, the audio data of 16 bits to be transferred is inputted to the signal inputting part 301, and the addition information while transferring the audio data is inputted to the addition information input part 302. A polarity clock having a polarity which is in accordance with whether the inputted audio data is of L channel or R channel is generated in the polarity clock generating part 304 and is outputted.

Simultaneously, the transfer clock generating part 202 generates and outputs the transfer clocks on the basis of the bit width per a sample of the audio data to be transferred and the line number of the data lines. Then, since the line number of the data lines is three, if there are six transfer clocks per a channel, the transfer of 16 bits audio data is possible. Then, it is controlled such that there are six transfer clocks per a channel. Simultaneously, the data conversion part 305 generates and outputs audio data on the basis of the bit width per a sample of the audio data to be transferred and the line number of the data lines. When the 16 bits audio data are transferred on three lines of data lines, the data are respectively divided into L15, L14 to L12, L11 to L9, L8 to L6, L5 to L3, L2 to L0, R15, R14 to R12, R11 to R9, R8 to R6, R5 to R3, and R2 to R0, respectively, and are outputted synchronized with the polarity clock and the transfer clock, respectively. Then, the L15 and the R15 are outputted with making pairs with the empty bits S0 and S1, respectively. When the addition information is inputted to the data conversion part 305, it is controlled such that the empty bits S0 and S0 are respectively outputted in correspondence with the addition information, respectively. The addition information here is, for example, sub code information, for example, sector information, for example, error information, which would be required at the data receiving side.

The data receiving part 306 receives the polarity clock and the audio data which are respectively outputted from the polarity clock generating part 304 and the data conversion part 305, respectively, in synchronization with the transfer clock which is outputted from the transfer clock generating part 303, perform a conversion that is reverse to the conversion which is carried out by the data conversion part 305 so as to receive the original sixteen bits audio data and the addition information, and outputs the audio data from the signal outputting part 307 and the addition information from the addition information outputting part 308, respectively.

Figure 24:
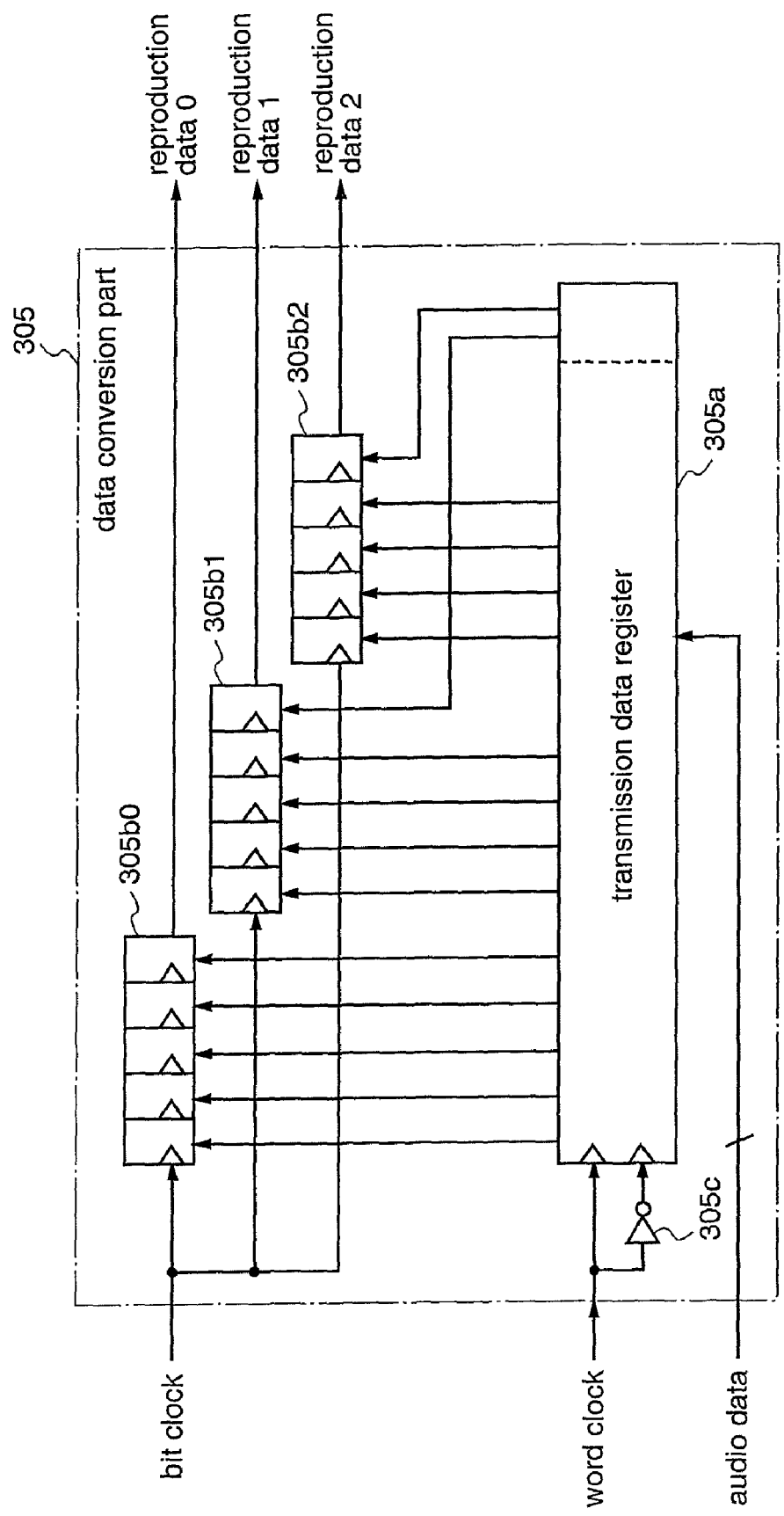
FIG. 24 is a construction example of a data conversion part in the fifth embodiment of the present invention.
Figure 25:
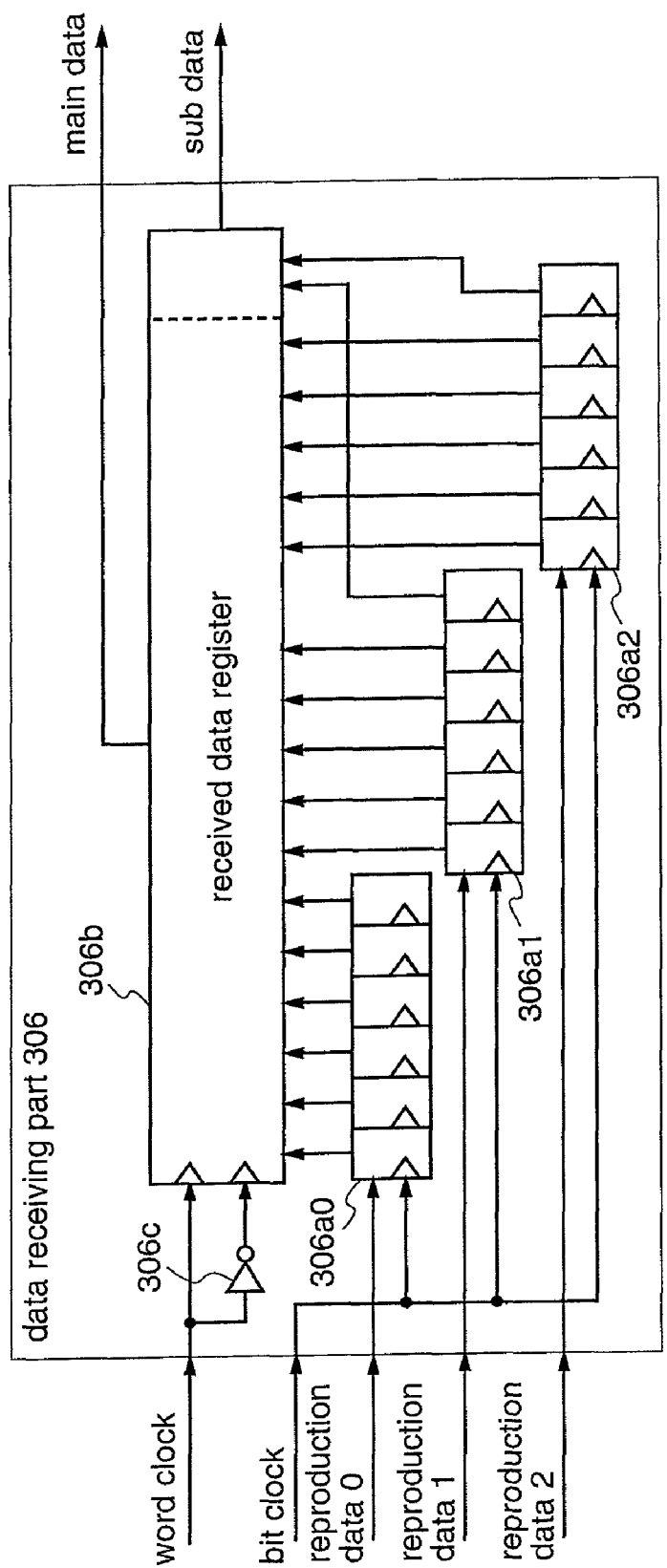
FIG. 25 is a diagram illustrating a construction example of a data receiving part in the fifth embodiment of the present invention.

As the data conversion part and the receiving part which correspond to the transfer format shown in FIG. 23, those which are shown in FIG. 24 and FIG. 25 are considered, respectively.

More particularly, the transmission data register 305*a* which is included in the data conversion part 305 shown in FIG. 24 takes in the audio data each time when the word clock is inverted by employing the word clock and its inverted clock that is generated by an inverter 305*c* as clocks. This audio data comprises two bits synchronous signals S0, S1 and the sixteen bits main data. The main data are transferred to the six bit length shift registers 305*b*0, 305*b*1, and 305*b*2 with divided into six bits, five bits, and five bits, respectively. In addition, to the shift registers 305*b*1 and 305*b*2, the synchronous signals S1, S0 are transferred to their top bits, respectively. The data which are transferred to these shift registers 305*b*0, 305*b*1, and 305*b*2, respectively, are successively outputted from the reproduced data 0, reproduced data 1, and reproduced data 2 with synchronized with bit clocks, respectively.

In addition, the six bit length shift registers 306*d*0, 306*d*1, and 306*d*2 which are included in the receiving part 306 shown in FIG. 25 successively receive the reproduced data 0 to 2 which were successively inputted thereto synchronized with the bit clock, and successively shift the same therein, and when the data of six bits are stored, they transfer the stored data from the parallel output to the received data register 306*b*. The top bits of the reproduced data 1 and reproduced data 2 have become the synchronous signals S0 and S1, and the shift registers 306*a*1 and 306*a*2 transfers their top bits as the sub data to the reception data register 306*b* and transfers the remaining data together with the data from the shift register 306*a*0 as the main data to the receiving data register 306*b*. The reception data register 306*b* outputs its top bit and its second bit as the sub data to the synchronization part 16 while outputs the remaining data as main data to the buffering control part 17. Here, the receiving data register 306*b* employs the word clock and its inverted clock inverted by the inverter 306*c* as clocks.

Accordingly, while since in the first to the third embodiments the sixteen bits main data is transmitted on a line, a bit clock as a transfer clock for transferring the data is required to be one of a high speed, and when the increase in the speed of multiple speed of the data dubbing advances, it would result in problems in the anti-noise property, in this fifth embodiment in which the 16 bits main data are transmitted on four lines, the speed of the transfer clock for transferring the data can be reduced, and the problem in the anti-nose property can be solved.

In addition, no transmission line is required for transmitting the synchronous signal since the synchronous signal is transmitted together with the main data, and further, by employing this synchronous signal as the sub data, it is possible to perform buffering from the correct position when performing the digital dubbing.

While in the above-described fifth embodiment the audio data is constituted in the bit width of 16 bits, the bit width of the audio data may be 20 bits, 24 bits, or other than those.

Further, while the number of the data lines is constituted as three lines, two or more data lines and the transfer format in which the empty bits are present may be employed with the same effects as described above.

Further, while in the above described fifth embodiment the bit position to be outputted employed in the conversion of the audio data is described with the format shown in FIG. 4, the bit position to be outputted may be constituted in the other format with the same effects as described above.

As described above, according to the audio data transfer device of the fifth embodiment of the present invention, the audio data is transferred in parallel on the plural data lines of the number which is less than the bit width per a sample of the audio data to be transferred and further the addition information is transferred with utilizing the empty bits which have occurred due to the parallel transmission being performed, the reduction in the speed of the transfer clock for transferring the audio data can be accomplished so as to easily realize the high multiple transfer of the audio data. In addition, in a case where it is needed to transfer the audio data at a higher speed, the problem that the transfer clock is likely subjected to the noises can be solved, thereby enabling performing buffering from the correct position when performing dubbing of the digital data, and also realizing an efficient transfer due to no transfer clock being required for transmitting the addition information.

APPLICABILITY IN INDUSTRY

As described above, the present invention generates a synchronous signal from the sub data and utilizes this as a timing signal for starting the buffering. Thus, the present invention is appropriate for performing buffering from the correct position. Further, it is possible to reduce the burden to the system control part by halting the buffering without employing the control by the system control part when there has occurred an error in the disc reproduction device, and further, it is possible to provide a replacement of the shock proof mechanism as well as rationalization of the system by such as memory reduction. Thus, the present invention is particularly useful as a device for performing digital dubbing from a CD player to another medium and can provide quite a wide and large applicability in industry.

The invention claimed is:

1. A buffering control method when buffering main data which was reproduced from an optical disc, comprising:
   receiving main data and sub data which were reproduced from an optical disc with word clocks as references, which word clocks comprise partitioning timings with taking a plurality of bits of said main data as a unit;
   generating a synchronous signal which is synchronous with said main data on the basis of said synchronous signal;
   starting buffering of said main data in synchronization with said synchronous signal; and
   writing the buffered data into another device which is a device having a recording medium to which the dubbing is performed in the state of the digital signal as it is.

2. The buffering control method of claim 1, wherein said synchronous signal is generated on the basis of the synchronous bit which is included in said sub data.

3. The buffering control method of claim 1, wherein said synchronous signal is generated on the basis of the particular pattern which is included in said sub data.

4. The buffering control method of claim 3, wherein said synchronous signal is counted periodically with the word clocks, and when the synchronous signals are not detected, the synchronous signals are interpolated at the periodical counting positions.

5. The buffering control method of claim 3, wherein said synchronous signal is counted periodically with the word clocks, and when the synchronous signals are not detected, the synchronous signals are interpolated at the periodical counting positions.

6. The buffering control method of claim 5, wherein the address to be obtained is presumed on the basis of the obtained address information, and when the address information is not obtained, the lacking address information is interpolated with utilizing said presumed address information.

7. The buffering control method of claim 1, wherein the buffering is halted with detecting the abnormality of the data which is reproduced from the optical disc on the basis the sub data.

8. The buffering control method of claim 7, wherein the buffering is halted when the period of the synchronous signal which is generated based on the specific pattern which is included in the sub data is disturbed.

9. The buffering control method of claim 7, wherein the buffering is halted when the parity check is carried out on the basis of the sub data and the error is judged.

10. The buffering control method as defined in claim 7, wherein the buffering is halted when the reproduction device of the optical disc transmits the sub data with attaching error information thereto and the error information is received.

11. The buffering control method of claim 7, wherein the address information is obtained from the sub data and the address information to be obtained is predicted on the basis of the obtained address information, and when the obtained address information and the predicted address information are in-coincident, the buffering is halted.

12. A buffering control device for buffering main data which was reproduced from an optical disc comprising:
a receiving part which receives main data and sub data which were reproduced from an optical disc with word clocks as references, which word clocks are partitioning timings with taking a plurality of bits of said main data as a unit;
a synchronizing part which generates a synchronous signal on the basis of said sub data; and
a buffering control part which starts buffering of said main data in synchronization with the synchronous signal and writing the buffered data into another device which is a device having a recording medium to which the dubbing is performed in the state of the digital signal as it is.

13. The buffering control device of claim 12, wherein said synchronizing part makes the signal which comprises the synchronous bit which is included in said sub data being detected as said synchronous signal.

14. The buffering control device of claim 12, wherein said synchronizing part makes the signal which was detected as the specific pattern included in said sub data as said synchronous signal.

15. The buffering control device of claim 14, further comprising:
a counter for counting said synchronous signal with said word clock periodically; and
a synchronous interpolation part which interpolates the synchronous signal at the periodic count positions when the synchronous signal is not detected.

16. The buffering control device of claim 12, wherein said buffering control part, which comprises an address obtaining part which obtains the address information from said sub data and a coincidence detection part which compares said address information and the designated address which is previously designated, starts buffering of said main data when said obtained address information and said designated address coincide with each other.

17. The buffering control device of claim 16, wherein said address obtaining part further comprises:
an address predicting part which predicts the address information to be obtained on the basis of said obtained address information; and
an address interpolation part which interpolates the lacking address information using the predicted address information when the address information is not detected.

18. The buffering control device of claim 12, further comprising:
an abnormality detection part which detects abnormality of the data which is reproduced from said optical disc on the basis of said sub data; and
said buffering control part halts said buffering when the abnormality of said reproduced data is detected by said amorality detection part.

19. The buffering control device of claim 18, wherein said abnormality detection part detects the abnormality of the data which is reproduced from said optical disc when the period of synchronous signal which is detected on the basis of the specific pattern which is included in said sub data is disturbed.

20. The buffering control device of claim 18, wherein said abnormality detection part detects the abnormality of the data which is reproduced from said optical disc when the parity check is carried out on the basis of the sub data and the error is judged.

21. The buffering control device of claim 18, wherein said abnormality detection part detects the abnormality of the data which is reproduced from said optical disc when the reproduction device of the optical disc transmits the sub data with attaching error information thereto and the error information is received.

22. The buffering control device of claim 18, further comprising:
an address obtaining part for obtaining an address information from said sub data;
an address predicting part for predicting an address information to be obtained on the basis of said obtained address information; and
said abnormality detection part detecting the abnormality of the data which is reproduced from the optical disc when said obtained address information and said predicted address do not coincide with each other.

23. A data transfer device which performs transfer of audio data utilizing the polarity clock indicating the polarity of the audio data for each channel, the transfer clock for transferring the audio data, and a plurality of audio data lines which are synchronized with the transfer clock, comprising:
a transfer clock generator part which generates the transfer clock of the number which corresponds to the number of the plural data lines which is less than the bit width per a sample for each sample of said audio data;
a polarity clock generator part which generates said polarity clock which is synchronized with said transfer clock;
a data conversion part which distributes said audio data per a sample to said plural number of data lines of the line number less than the bit width per a sample as well as synchronizes the distributed audio data with the polarity clock so as to output the same with synchronized with the transfer clock with a bit unit; and
a data receiving unit which receives the audio data which was distributed to the plural data lines of the line number that is less than the bit width per a sample, said transfer clock, and said polarity clock, and restores the audio data which are distributed to the plural data lines to output the audio data with synchronized with the transfer clock and the polarity clock.

24. The data transfer device of claim 23, wherein said transfer clock generation part generates said transfer clock of the number which corresponds to the line number of the plural data lines which is less than the bit width that is obtained by adding an addition information to the per sample bit width of said audio data, said data conversion part receives said audio data per a sample and its addition information as its inputs, and distributes said audio data of the bit width that is obtained by adding said addition information to said audio data per a sample and the addition information to the plural data lines of the line number that is less than the bit width per a sample of said audio data as well as synchronizes the distributed audio data and said addition information with said polarity clock so as to output the same with synchronized with the transfer clock with a bit unit, and said data receiving unit receives the audio data which was distributed to the plural data lines, said transfer clock, and said polarity clock, and restores the audio data which are distributed to the plural data lines and said addition information to output the audio data and the addition information with synchronized with the transfer clock and the polarity clock.

25. The data transfer device of claim 24, wherein said data conversion part employs one or plurals selected among the sub code data of said audio data, the sector information, and the error information which are inputted as said addition information.

26. A data transfer device which performs transfer of audio data utilizing the polarity clock indicating the polarity of the audio data for each channel, the transfer clock for transferring the audio data, and a plurality of audio data lines which are synchronized with the transfer clock, comprising:

a transfer clock generator part which generates the transfer clock of the number which corresponds to the number of the plural data lines which is less than the bit width which is obtained by adding an addition information to the bit width per a sample, for each sample of said audio data;

a polarity clock generator part which generates said polarity clock which is synchronized with said transfer clock;

a data conversion part which distributes said audio data per a sample and the addition information to said plural number of data lines of the line number less than the bit width per a sample as well as synchronizes the distributed audio data and said addition information with said polarity clock so as to output same with synchronized with the transfer clock with a bit unit.

27. A data transfer device which performs transfer of audio data utilizing the polarity clock indicating the polarity of the audio data for each channel, the transfer clock for transferring the audio data, and a plurality of audio data lines which are synchronized with the transfer clock, comprising:

a data receiving unit which receives the audio data which was distributed to the plural data lines of the line number that is less than the bit width that is obtained by adding an addition information to the bit width per a sample of said audio data, said transfer clock, and said polarity clock, and restores the audio data which are distributed to the plural data lines and the addition information to output the audio data and the addition information;

a synchronizing part which generates a synchronous signal on the basis of said addition information; and a buffering control part which starts buffering of said audio data on the basis of said synchronous signal.

28. A data transfer device which performs transfer of audio data utilizing the polarity clock indicating the polarity of the audio data for each channel, the transfer clock for transferring the audio data, and a plurality of audio data lines which are synchronized with the transfer clock, comprising:

a transfer clock generator part which generates the transfer clocks of the number which corresponds to the number of the plural data lines which is less than the bit width which is obtained by adding an addition information to the bit width per a sample, for each sample of said audio data;

a polarity clock generator part which generates said polarity clock which is synchronized with said transfer clock;

a data conversion part which distributes said audio data per a sample and its addition information to said plural number of data lines of the line number less than the bit width per a sample as well as synchronizes the distributed audio data and said addition information with said polarity clock so as to output same with synchronized with the transfer clock with a bit unit;

a data receiving unit which receives the audio data which was distributed to the plural data lines of the line number that is less than the bit width that is obtained by adding an addition information to the bit width per a sample of said audio data, said transfer clock, and said polarity clock, and restores the audio data which are distributed to the plural data lines and the addition information to output the audio data and the addition information;

a synchronizing part which generates a synchronous signal on the basis of said addition information; and a buffering control part which starts buffering of said audio data on the basis of the synchronous signal.

* * * * *